US012032574B2

(12) United States Patent
Conrad et al.

(10) Patent No.: US 12,032,574 B2
(45) Date of Patent: Jul. 9, 2024

(54) SYSTEMS AND METHODS FOR INTELLIGENT DATABASE REPORT GENERATION

(71) Applicant: People Center, Inc., San Francisco, CA (US)

(72) Inventors: Parker Rouse Conrad, San Francisco, CA (US); Kyle Michael Boston, San Carlos, CA (US); Nikunj Aggarwal, Secaucus, NJ (US); Siddhartha Gunda, Milpitas, CA (US); Chewei Hu, Mill Valley, CA (US); Himanshu Nanda, Firozpur (IN); VenuMadhav Kattagoni, Telangana (IN); Jhalak Gupta, Madhya Pradesh (IN); Utkarsh Bhatia, Uttar Pradesh (IN); Sanket Ketkar, Karnataka (IN)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 18/074,198

(22) Filed: Dec. 2, 2022

(65) Prior Publication Data
US 2024/0184781 A1    Jun. 6, 2024

(51) Int. Cl.
*G06F 16/2453* (2019.01)
*G06Q 10/105* (2023.01)

(52) U.S. Cl.
CPC ..... *G06F 16/24544* (2019.01); *G06Q 10/105* (2013.01)

(58) Field of Classification Search
CPC .............. G06F 16/24544; G06Q 10/105
See application file for complete search history.

(56) References Cited

U.S. PATENT DOCUMENTS

| 2004/0113945 | A1* | 6/2004 | Park | G06F 30/13 |
| | | | | 715/765 |
| 2004/0267700 | A1* | 12/2004 | Dumais | G06F 16/31 |
| 2009/0024940 | A1* | 1/2009 | Zeringue | G06F 3/0481 |
| | | | | 715/763 |

(Continued)

OTHER PUBLICATIONS

Challenges of comparing and matching roads from different spatial datasets Mousa Almotairi,Tariq Alsahfi,Ramez Elmasri PETRA '19: Proceedings of the 12th ACM International Conference 2019, pp. 164-171 https://doi.org/10.1145/3316782.3316787 (Year: 2019).*

*Primary Examiner* — Mark D Featherstone
*Assistant Examiner* — Kweku William Halm
(74) *Attorney, Agent, or Firm* — Dority & Manning, P.A.

(57) ABSTRACT

Systems, devices, computer-implemented methods, and tangible non-transitory computer-readable media for generating reports from one or more databases that store disparate datasets are provided. Specifically, the proposed systems enable the intelligent generation of reports from multiple datasets by automatically determining a proposed set of join configurations for combination of the multiple datasets. The proposed set of join configurations can be executed as proposed and/or can be edited or customized by the user to generate reports from the multiple datasets. Thus, the proposed systems and methods can provide intuitive and user-friendly tools for generating data reports that accurately synthesize and summarize data contained in multiple different datasets.

23 Claims, 14 Drawing Sheets

(56) References Cited

U.S. PATENT DOCUMENTS

| | | | | |
|---|---|---|---|---|
| 2016/0232457 A1* | 8/2016 | Gray | .................. | G06F 16/26 |
| 2017/0076113 A1* | 3/2017 | McNamara | ......... | G06F 21/6245 |
| 2017/0116552 A1* | 4/2017 | Deodhar | ............ | G06Q 10/0639 |
| 2020/0233905 A1* | 7/2020 | Williams | .............. | G06F 16/904 |
| 2020/0278977 A1* | 9/2020 | Halstead | ............... | G06F 16/285 |
| 2020/0409944 A1* | 12/2020 | Nguyen | ................ | G06F 16/972 |
| 2022/0083978 A1* | 3/2022 | Weindling | ........... | G06Q 10/105 |
| 2022/0091707 A1* | 3/2022 | Meriaz | ............. | G06Q 10/06311 |

* cited by examiner

Reports > New Report

○ Search for a recipe

Functions
☐ Accounting
☐ Engineering
☐ Finance
☐ Human Resources
☐ Insurance
☐ IT
☐ Legal
☐ Managers
☐ Payroll
☐ Recruiting
☐ Security
☐ Support & Customer Success

Products
☐ App Management
☐ Device Management
☐ HR Management
☐ Insurance & Benefits
☐ Learning Management
☐ Payroll
☐ Talent Management 400a ○ You can create a report starting from one of the recipes on this page or you can create a new report from scratch. Reports created from a recipe can still be customized, saved, and shared.      [Start from scratch] ← 404a

Featured recipes

Leave policy balances report
A snapshot view of the current balance in hours for all leave policies (such as vacation, sick leave, etc.) for each employee.

IT desk tickets resolved per hours worked (by period)
View the count of IT desk tickets resolved per week compared to the number of hours worked.

Repository pull requests: average time-to-merge report
View the average time between when a pull request (PR) is created and when it's merged, as a signal of your engineering velocity.

Payroll report
View payroll data by employee or aggregated across employees.

Employer costs trend report template
Report on and view your total historical employer costs, broken down by office location.

New hires by month
View the count of new hires that have joined your company by month.

401(k) contribution summary
Employee and employer 401(k) contributions year-to-date.

Access Control Report
View details on which people in your organization have admin access to which services.

Aging pull requests by manager report
Show a report of open pull requests that were created more than a week ago by manager.

Variable Selector

Select the variable

Module > Time Off > Accrual Transactions > Accrual Date

| | | | |
|---|---|---|---|
| Employee | > | Accrual Transactions | > |
| Payroll | > | Aggregated Accrual Per Policy | > |
| Time Off | | Aggregated Balance Per Policy | > |
| Time & Attendance | > | Aggregated Usage Per Policy | > |
| Insurance | > | Balance Transactions | > |
| Benefits | > | Usage Transactions | > |
| COBRA | > | | |
| Devices | > | | |
| Identity Management | > | | |
| Company Security | > | | |
| Documents | > | | |
| Notification | > | | |
| ATS Candidate | > | | |
| Background checks | > | | |
| Carta | > | | |
| Custom fields | > | | |
| Performance management | > | | |

| | |
|---|---|
| ▨ | T Time accrued in hours |
| ▨ | ▦ Accrual Date |
| ☐ | T Accrual Type |
| ☐ | T Granted by |
| ☐ | T Policy type |
| ☐ | T Policy name |
| ☐ | ▦ Policy start date |
| ☐ | T Num hours offered by policy |

New Formula Field | 🔍 Search

Selected Variables

Employee
- ● Employee ✕   ≡ Compensation time period ✕
- $ Annual salary equivalent ✕
- $ Compensation value ✕   ≡ Payment type ✕

Payroll
- T Payroll name ✕   $ 1099 Payment ✕
- $ PTO Payout (US Vacation Policy) ✕

Time Off
- T Time accrued in hours ✕   ▦ Accrual Date ✕

Continue

Back

FIG. 4C

Add a formula field
Create a formula field that is calculated from your existing data.

Field name*

[Field name]

Field description*

[Field description]

Formula ← 402h $f_x$ Insert function • Invalid

1

Get hel[p]

| REPORT FIELDS |
|---|
| Employee Details > Employee<br>Employee |
| Payslip > Payroll name<br>Payroll name |
| Compensation > Compensation time period<br>Compensation time period |
| Compensation > Annual salary equivalent<br>Annual salary equivalent |

Data type

Auto-detect

If this report is aggregated, this field will be calculated*

Pre-aggregation (recommended)

400h

×

What are formula fields? ← 404h

A formula field calculates a value based on the formula you enter, allowing you to create new data from your existing data. Formula fields are typically derived from other variables and can include one or more formulas or operators.

When added to a report, the formula field will produce an output for each row within the report.

Remember: spaces and capitalization don't matter in these formulas. When typing a field variable or a function, you can hit 'tab' or select the item in the auto-suggested list.

Examples ← 406h

Scenario: You are running a report that contains the employee_taxes and employer_taxes fields. You want to create a new field that calculates the sum of these two taxes for each employee. You can create a formula field named "Total taxes" that equals to:

SUM( employee_taxes , employer_taxes )

Scenario: You want to add a field that is the employee's tenure in years. You can create a formula field named "Employee tenure in years" that equals to:

(TODAY() - start_date ) / 365.25

Scenario: You want to return the name of each employee's manager. You can create a formula field named "Employee's manager" that equals to:

ORG( employee , 'manager')

Back  Continue

FIG. 4H

Add a formula field
Create a formula field that is calculated from your existing data.

Field name*
[Field name]

Field description*
[Field description]

Formula $f_x$ Insert function • Invalid

1 SELECT()

FIELDS
[A] all_rows
SELECT(data_set,field,
logical_condition [and/or
logical_condition_2]...)

400i

404i →

SELECT
Returning a list of values that match the logical condition(s).

Syntax
SELECT(data_set, field, logical_condition [and/or logical_condition_2]...)

data_set: The dataset that contains the values you want to analyze.

Select the module that has the values you want to use such as Employee, Devices, Payroll, or Jira.

Field: The value from the data_set you want to be returned in the list. This is typically an employee attribute such as Title, but can also be a calculated value that uses fields from within the data_set, such as TODAY() – Start date the data_set.

logical_condition: One or more conditions that evaluate to TRUE or FALSE. All values from the data_set that evaluate to TRUE will be included in the calculation. Think of this like a filter, where only items that match the logical conditions will be included in the list.

You can add a logical_condition to specify how a record in the data-set is matched to an attribute of that row by adding a logical_condition like Department = Department.

Examples

406i →

Scenario: Calculate the average annual compensation in the employee's department.

AVG (SELECT ( Employee , Annual_compensation , department == department ))

Result: The SELECT function returns a list of values, which is used to calculate the average. you'd need to include an AVG function around the SELECT function to aggregate the list of values returned by SELECT.

Scenario: Calculate the proportion of an employee's hours worked among the

402i

Get help with the formula editor.

Data type
Auto-detect

If this report is aggregated, this field will be calculated*
Pre-aggregation (recommended)

Back     Continue

FIG. 4I

| Custom report 402i | | | | | | | |
|---|---|---|---|---|---|---|---|
| Build / Filters | Q Search for an employee | | | | < Share / ✓ Save / ↓ Download | | |
| Dates<br>In last 3 months:<br>02/10/2022 – 05/10/2022 | Employee | Payroll name | Comp. time period | Annual salary equivalent | Comp. value | Payment type | 1099 Payment | PTO Pyout (US Vaca. Pol.) |
| Columns | S. Simred | Hour | | $111 | Default | N/A | N/A |
| Employee | B. Bolleck | Year | | $111,000 | Default | N/A | N/A |
| Payroll name | T. Polk | Hour | | $11 | Default | N/A | N/A |
| Compensation time period | R. Tijuan | Year | | $175,000 | Default | N/A | N/A |
| Annual salary equivalent  ✕ | N. Josh | Year | | $125,000 | Default | N/A | N/A |
| Compensation value  ✕ | J. Pisco | Year | | $125,000 | Default | N/A | N/A |
| Payment type  ✕ | A. Inths | Year | | $100,000 | Default | N/A | N/A |
| 1099 Payment  ✕ | C. Campbell | Year | | $100,000 | Default | N/A | N/A |
| | C. Callum | Year | | $100,000 | Default | N/A | N/A |
| Row Grouping<br>Drag and drop variables here | T. Mass | Year | | $150,000 | Default | N/A | N/A |
| | R. Richards | Year | | $100,000 | Default | N/A | N/A |
| | J. Pickney | Year | | $90,000 | Default | N/A | N/A |
| | B. Gross | Year | | $90,000 | Default | N/A | N/A |
| | Deller | Year | | $100,000 | Default | N/A | N/A |

Showing 256 of 256

400j

Report created successfully. You still need to run and save it, before it appears on your dashboard.  ✕

FIG. 4J

SYSTEMS AND METHODS FOR INTELLIGENT DATABASE REPORT GENERATION

FIELD

The present disclosure generally relates to computer systems. More particularly, the present disclosure relates to the generation of reports from databases containing multiple disparate datasets via automatic determination of one or more join configurations.

BACKGROUND

Organizations use different types of software applications and computing systems to manage processes and information across an enterprise. Generally, each different application and computing system provides specialized features, functionality, and operations directed toward a specific solution. However, different applications and systems usually operate in isolation without communicating with one another and maintain their own separate sets of organizational information (e.g., in the form of disparate or disjointed datasets).

As a result, organizational information often remains siloed and becomes inconsistent and inaccurate when one or more changes are not reflected across different applications and systems. Further, endless manual updates and numerous, bespoke software integrations usually are required to maintain accuracy and consistency of organizational information and to support organizational processes across various applications and systems. As such, existing systems fail to provide intuitive and user-friendly tools for generating data reports that accurately synthesize and summarize data contained in multiple different datasets.

SUMMARY

Aspects and advantages of embodiments of the present disclosure will be set forth in part in the following description, or can be learned from the description, or can be learned through practice of the embodiments.

According to an example embodiment of the present disclosure, a computing system for intelligent generation of data reports can include one or more processors. The computing system can further include one or more databases that store a set of organizational data. The set of organizational data can include a plurality of different datasets. Each of the plurality of different datasets can include a number of respective data elements. The computing system can further include one or more non-transitory computer-readable media that collectively store instructions that, when executed by the one or more processors cause the computing system to perform operations. The operations can include receiving a request for generation of a report. The report can include a plurality of requested data elements. The operations can further include identifying two or more of the plurality of different datasets that collectively contain the plurality of requested data elements. The operations can further include automatically generating one or more join configurations for combination of the two or more of the plurality of different datasets. The operations can further include executing the one or more join configurations to generate a combined dataset from the two or more of the plurality of different datasets. The operations can further include generating the report based on the combined dataset.

According to another example embodiment of the present disclosure, a computer-implemented method for intelligent generation of data reports can include receiving, by a computing system that can include one or more computing devices, a request for generation of a report. The report can include a plurality of requested data elements. The computer-implemented method can further include identifying, by the computing system, two or more of a plurality of different datasets that collectively contain the plurality of requested data elements. The computer-implemented method can further include automatically generating, by the computing system, one or more join configurations for combination of the two or more of the plurality of different datasets. The computer-implemented method can further include executing, by the computing system, the one or more join configurations to generate a combined dataset from the two or more of the plurality of different datasets. The computer-implemented method can further include generating, by the computing system, the report based on the combined dataset.

Other embodiments of the present disclosure are directed to various systems, apparatuses, non-transitory computer-readable media, computer-implemented methods, user interfaces, and/or devices that can facilitate intelligent generation of data reports as described herein.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4A depicts an example graphical user interface for browsing and selecting a report recipe or starting a new custom report, according to example embodiments of the present disclosure.

FIG. 4C depicts an example graphical user interface for selecting data elements for inclusion in a new custom report, according to example embodiments of the present disclosure.

FIG. 4H depicts an example graphical user interface for adding a formula field to a report, according to example embodiments of the present disclosure.

FIG. 4I depicts an example graphical user interface for editing a formula field for inclusion in a report, according to example embodiments of the present disclosure.

FIG. 4J depicts an example graphical user interface for viewing a report, according to example embodiments of the present disclosure.

Figure 1:
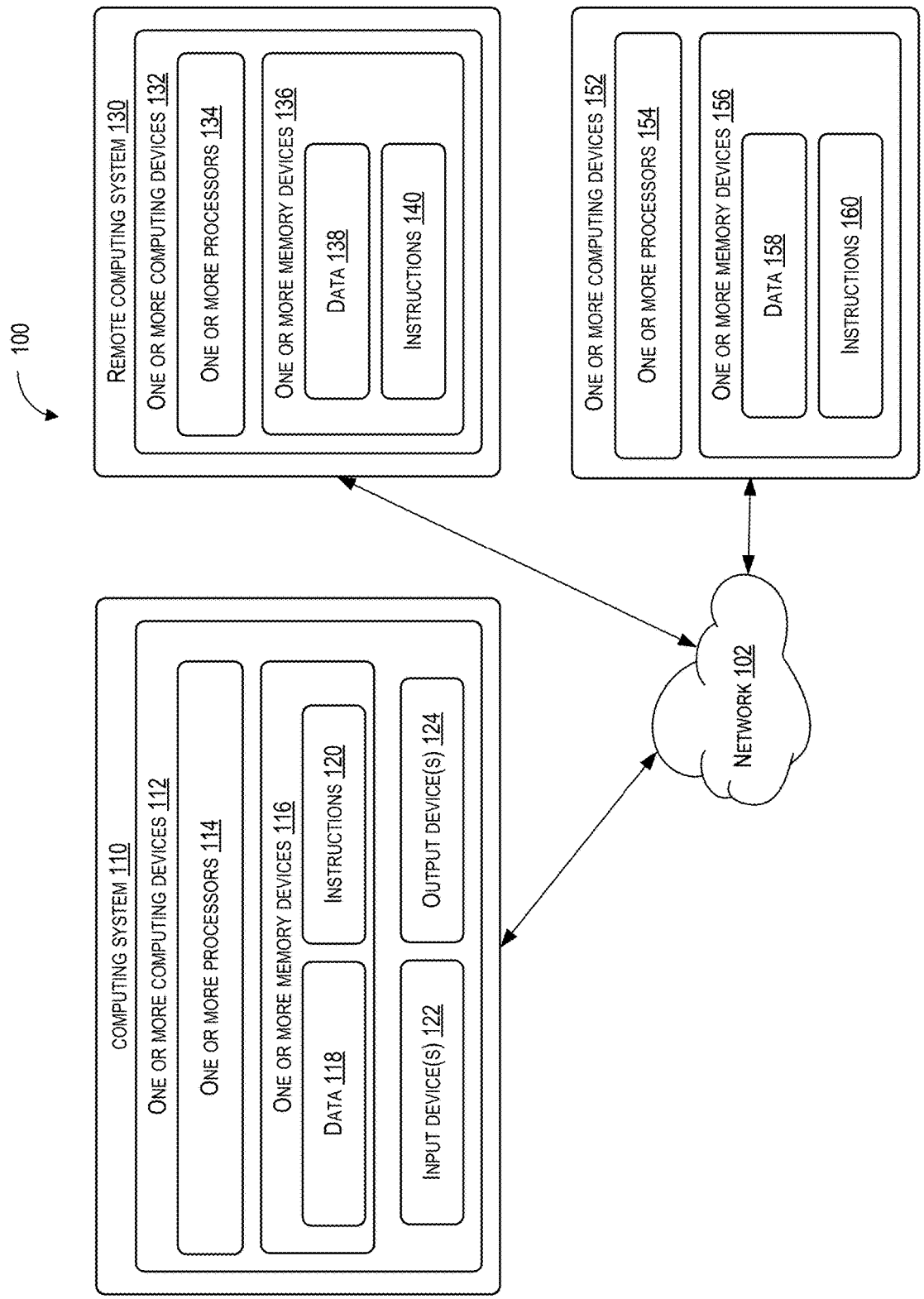
FIG. 1 depicts a block diagram of an example environment including a computing system that performs operations, according to example embodiments of the present disclosure.

Reference numerals that are repeated across plural figures are intended to identify the same features in various implementations.

DETAILED DESCRIPTION

Generally, the present disclosure is directed to computerized systems capable of generating data reports from one or more databases containing multiple disparate datasets. In some implementations, the reports generated by the proposed reporting tools can be referred to as "connected data reports" and can be implemented in the context of an organizational management platform that includes various applications for organizing, processing, and/or performing operations based on the data of an organization. Specifically, the proposed systems enable the intelligent generation of reports from multiple datasets by automatically determining a proposed set of join configurations for combination of the multiple datasets. The proposed set of join configurations can be executed as proposed and/or can be edited or customized by the user to generate reports from the multiple datasets. Thus, the proposed systems and methods can provide intuitive and user-friendly tools for generating data reports that accurately synthesize and summarize data contained in multiple different datasets.

In some implementations, the proposed systems and methods can enable generation of a custom report (also referred to herein as a "custom connected data report") that includes user-specified data. For example, the user can be presented in a graphical user interface with a list of various datasets that are included in or otherwise accessible to the organizational system. The user can specify various portions or subsets (e.g., columns, objects, attributes, etc.) of various datasets for inclusion in the report. As described herein, the organizational system can automatically generate a number of join configurations for joining the specified portions of the datasets.

In addition to custom reports, in some implementations, the proposed systems and methods can generate a report from a template, which may also be referred to as a "recipe". The organizational system can provide a number of different recipes which are pre-built for different use cases. The user can select a pre-defined recipe (e.g., that contains one or more pre-defined join configurations to join data from two or more datasets). The user can receive a report generated according to the recipe. Additionally, the user may be able to edit the recipe and/or resulting report. For example, the user can start from the recipe but edit, add, and/or remove various join configuration(s).

In some implementations, some or all of the data that is accessed for generating the report can include third-party application data that is accessed from a third-party application. For example, a user can be provided with the ability to select data from a number of different datasets. At least some of the datasets can be datasets collected, imported, and/or accessed from or otherwise associated with a third-party application. Thus, one benefit of the present disclosure is that it enables joining third-party data with existing organizational data such as, for example, human resources data. As one example, a report can be generated to understand how issue tracking tickets are handled by different employee(s) and/or department(s) in a third-party agile project management system. Thus, the proposed organizational system can include an extensive number of recipes related to various use cases and/or applications (e.g., third-party applications). The user can be presented with a graphical menu where recipes related to various use cases and/or applications can be selected, searched, and/or filtered.

According to an aspect of the present disclosure, when generating a custom report or a recipe-based report, the organizational system can automatically determine a number of join configurations for joining multiple datasets. In some implementations, the join configurations can be pre-established default join configurations for a given set (e.g., pair) of different datasets. As one example, a default join configuration can be established for combining data from a payroll application dataset and time and attendance application dataset. As another example, a default join configuration can be established for combining a payroll application dataset and a dataset that contains a roster of employees. The default join configurations can be established as initial defaults by the developer of the reporting system and/or can be established by the user for similar joins going forward.

In some implementations, the organizational system can automatically determine the join configurations by evaluating a set of join configuration logic. For example, the organizational system can identify a number of shared data fields, values, columns, objects, and/or other data elements between a set (e.g., pair) of different datasets. The organizational system can select one of the number of shared data fields, values, columns, objects, and/or other data elements between a set (e.g., pair) of different datasets as a join key for the join configuration according to various criteria. Thus, the proposed systems and methods provide a unique approach to automatically determining the join configurations. Join configurations can define how the organizational system joins two or more different datasets.

As one example, a degree of matching between the shared data fields, values, columns, objects, and/or other data elements can be evaluated. For example, the degree of matching can be based on the number of specific entries that match between the datasets. As another example, the degree of matching can be based on the data type of the data fields, values, columns, objects, and/or other data elements. For example, date fields from one dataset can be matched with date fields from another dataset. For example, the organizational system can perform data type inference in which the data type of a given data element is inferred. The inferred data type can then be used to determine a degree of matching between data elements from different datasets.

As another example, a sparsity between the respective data fields, values, columns, objects, and/or other data elements in the datasets can be evaluated. For example, a degree to which a certain data field, column, or object within two or more datasets is sparse can be evaluated. Less sparse data fields, values, columns, objects, and/or other data elements can be preferred for selection as a join key.

As yet another example, certain data fields, values, columns, objects, and/or other data elements can be prioritized for using as the join key when shared and available. For example, an employee identifier fields, values, columns, objects, and/or other data elements can be prioritized for selection if available (e.g., if shared between a set (e.g., pair) of different datasets). The priority can be established by the developer of the reporting system and/or can be established by the user. For example, a user can pre-establish a correspondence between certain data fields, values, columns, objects, and/or other data elements within two or more datasets.

Thus, the organizational system can automatically select a shared data field, column, or object as a join key on the basis of a degree of matching, a sparsity metric, according to a pre-defined prioritization, and/or other conditions. For example, a scoring function can evaluate these characteristics and provide a score for a number of candidate join key(s)/condition(s). The join key/condition that receives the highest score can be selected as the initial proposed join configuration.

In some implementations, the organizational system can surface a number of potential join configurations to the user. For example, the organizational system can propose an initial join configuration, but can also provide a list of alternative join configurations from which the user can select. For example, the alternative join configurations can be presented in a drop down menu. Information such as matching score, level of sparsity, etc. may or may not be given for each potential join configuration.

More generally, the organizational system can include or provide a graphical user interface that enables the user to view aspects of the generated report. As one example, the graphical user interface can include a join configuration section that shows the proposed join configurations and enables the user to edit, remove, and/or add the join configurations. As another example, the graphical user interface can include a schema section that presents a schema of how the reports are joined in a graphical presentation. As yet another example, the graphical user interface can include a preview section that presents a preview of the report data.

Thus, in some implementations, regardless of whether the report is a custom report or a report generated from a recipe, the proposed graphical user interface can expose the underlying framework of the report. The user is able to modify the report, starting from the recipe in whatever way the user wants. Therefore, unlike fixed templatized reports, a recipe-based report can be viewed as simply an entry point, which gives the user preselected values, but then the user can modify the report in any way the user wants.

In some implementations, when the report includes a dataset collected from or associated with a third-party application or other changing datasets, the organizational system can determine whether the dataset has been appropriately refreshed and/or whether the dataset is up to date. For example, certain datasets may have a refresh interval in which the dataset refreshes within a database. The organizational system can make sure that the report contains the latest copy of the dataset. For example, if the dataset has not completed an initial import, it will not show up in reports as being available yet. The organizational system can wait until an ingestion of a dataset has been completed before visualizing this data for selection for inclusion within a report. Ongoing refreshes can be handled through a combination of web hooks and application programming interface (API) refreshes.

Another aspect of the proposed reporting systems is the efficient generation of a report preview. For example, the organizational system can generate a report preview in a manner that shows in the report preview a set of preview data that is most representative of the full report. Specifically, the preview data can include a sampling of the full data to be included in the report. To provide an example, a report may include data from three tables and generation of the report may include joining the three tables. According to an aspect of the present disclosure, to generate the preview data, some implementations of the organizational system do not load data in all those tables, join them and sample them, because this approach would have significant computational latency, because it requires loading of all of the data. Instead, some implementations of the organizational system sample all of the tables independently and then join the samples to generate a preview dataset. Thus, performing sampling prior to joining (rather than joining and then sampling) can improve the computational efficiency of report preview generation.

However, in some instances, if samples from datasets (e.g., tables) are naively joined, the joins will be mostly empty, resulting in a preview dataset that contains mainly empty data. In some implementations, to prevent this result, the organizational system can oversample from the datasets and then generate the preview data by removing empty entries and/or selecting entries based on degree of sparsity.

To provide an example, assume it is desired to have a report preview with 20 rows for previewing data from three tables, when the organizational system loads or samples from the three tables, the organizational system may load or sample 100 rows from each table (e.g., 100 random rows). The organizational system can then join the 100 rows (e.g., according to automatically determined join configuration(s)). The organizational system can then take 20 of the "best" rows out of the joined tables for use in the preview. For example, the 20 rows can be selected to be most representative of the data. For example, the 20 rows that have the least number of empty cells can be selected.

In other implementations, the selection of the initial samples (e.g., the initial 100 rows) is not random but is instead guided by sampling logic. As one example, the sampling of the tables can be based on a data field, column, or object that is expected to be included and/or non-sparse in the largest number of tables. For example, an identifier field (e.g., employee identifier) can be used as focus for initial sampling.

In some implementations, once a sample join table or other form of preview dataset has been created, the preview dataset can be maintained so that if the user modifies the report in certain fashions, then the preview data can be reused, without requiring the sampling process to be performed again, thereby conserving computational resources. For example, if the user changes the grouping or aggregation of the report in a way that does not alter the underlying datasets or their joins, then the organizational system may reuse the preview dataset to generate a new preview.

Thus, the proposed organizational system provides previews that both benefit the consumer of the report (e.g., by providing a preview that is most representative of the full report), while also providing latency-based benefits (e.g., by performing preview sampling in a way that is most likely to include non-sparse data which enables the organizational system to avoid re-performing the sampling process).

In some implementations, the number of samples performed for generating the preview data can be adapted based on the content of the report. Thus, in some cases, the organizational system can detect that a lesser number of rows are needed to be sampled, whereas in other cases, a larger number of rows should be sampled. As an example, for a report that joins employee data and data from a software development application, the organizational system may fetch a larger number of rows for the software development application. This may be based on knowledge that when the rows are joined, it is less likely to have a match. So in the sampling, the organizational system may fetch a larger number of rows. In another example, for a report that joins employee data and payroll data, the organizational system may fetch a smaller number of rows. This may be based on expectation that payroll data and employee data will have a higher degree of matching (e.g., a higher degree of matching on an initial proposed join key). Thus, by adaptively determining a number of samples to perform based on an expected degree of matching, an appropriate balance can be struck between the quality of preview data and the sampling latency.

Another aspect of the present disclosure relates to providing the user with the ability to modify the proposed join configurations. For example, the modification can include adding a new join configuration or "action". For example, the new action can be a new aggregation or a new join (e.g., where adding a new join can involve adding additional data elements from an additional dataset that is different from initial datasets used to generate an initial combined dataset and/or an initial connected data report). For example, an aggregation can refer to performing grouping at a department level or similar. Thus, the report can be entirely customizable on how the data is joined or merged, when or where the data is aggregated, etc.

In some implementations, the datasets of the organizational system can be contained in one or more "no SQL" databases (e.g., one or more MongoDB databases). Thus, the proposed report generation tools can provide SQL-like interfaces over "no SQL" databases.

In some implementations, the reports and/or reporting functionality described herein can be accessed within a dedicated reports application (e.g., within the organizational management platform). In addition or alternatively, in some implementations, the reports and/or reporting functionality described herein can be embedded within other applications (e.g., within other applications within the organizational management platform). To provide an example, a user may be in a payroll application working to approve payroll, by embedding reports within the payroll application, there are opportunities to surface insights and different reports there which may improve the user's experience. As such, the proposed systems and methods can enable a reports frame to be embedded within any other application. In some implementations, the user may be able to expand the embedded report to a full page view and access the full configurability that they would have within the dedicated reports application.

In some implementations, to enable embedded reports, the organizational system can cache and store data that is included in various reports. Then, when the user visits a particular page or application, the report data will load right away rather than taking time for the report to run. Thus, certain implementations may serve a cache view of a report. The cached report can be manually updated (e.g., an update can be triggered by a user) and/or can be automatically updated (e.g., according to some periodicity and/or triggered by a change in data). More particularly, in some implementations, an automatic update can be performed when the organizational system detects that data written in the databases will affect or change the report. For example, the organizational system can perform dependency tracking as applied to reports to detect which reports could be potentially affected by a change in underlying data. When a change is mapped to a report, the report can be automatically refreshed, so that the cache is always fresh/accurate. In another example, a report can be refreshed when a threshold number of changes to the underlying data have been detected (e.g., as opposed to a refresh upon every single data change).

Another aspect of the present disclosure provides handling of permissions as applied to reports. For example, in some instances, each different user may have a different set of permissions to access different data. If report data is cached and then viewed at a company level this may not account for permissions. However, caching reports at an individual level creates significant computational overhead. Therefore, some implementations of the present disclosure can generate a company level cache of reports as a base and then apply permissions on the company level cache to generate a user-level view of the report that accounts for user-specific permissions.

As another example, the ability to generate reports quickly can be enhanced by enabling parallelized report generation (e.g., a report can be parallelized over multiple (e.g., tens, hundreds) of central processing units (CPUs) so that the report is generated without an apparent delay to the user).

Another aspect of the present disclosure is directed to a drill down feature for reports. The drill down feature can enable users to quickly dis-aggregate data that is currently shown in an aggregated form. For example, a report may show data aggregated or grouped by a certain attribute (e.g., by department). The user can click on the data to quickly dis-aggregate and see the data on an individual basis. This process can be inherent to any grouped or aggregated data. Therefore, a user can "drill down" any number of levels on any number of hierarchical aggregations. For example, data which has been dis-aggregated from department to team status can be further dis-aggregated from team to individual status. Thus, in some implementations, the organizational system can automatically recognize that an aspect or element of any report is an aggregation of data that can be broken down. In any of such instances, the organizational system can provide the user with the ability to quickly dis-aggregate the data, any number of layers down.

The systems, methods, and computer program products described herein provide a number of technical effects and benefits. As one example, by automatically determining a number of join configurations for generating a report, the proposed systems, methods, and computer program produces described herein can facilitate more efficient report generation. For example, by applying various logic, rules, or default settings to determine join configurations that represent an optimal way to combine data from multiple datasets, a report can be generated with fewer trial-and-error iterations. This can conserve computational resources such as processor usage, memory usage, network bandwidth, etc.

As another example, the embodiments described in the present disclosure perform integration and synchronization of organizational data across a variety of applications and systems (e.g., 5, 10, 100, 1000, etc.) that utilize different underlying technologies and technical designs more efficiently and with fewer computing resources (e.g., less processing power, less memory usage, less power consumption, etc.), that would otherwise be wasted by maintaining custom, proprietary, and/or manual processes. In particular, examples of the present disclosure integrate organizational data and associated processing across different applications and systems using a rigorous computerized process that provides high-throughput, resilient, and rapid synchronization of organizational data across distributed applications and computing systems.

Some example aspects of the present disclosure can be implemented in or by an organizational management platform that controls and leverages organizational data to manage organizational applications such as payroll, operations, human resources (e.g., onboarding and offboarding), benefits, information technology and device management, third-party application integration and access, and many others.

The organizational management platform can hold, for each of one or more organizations, a centralized set of organizational data that acts as a single, centralized system of record for all organizational management processes for that organization. Each organization can include a number of users which are able to access and interact with the organizational management platform. Some users may have administrative permissions which define whether the user is able to access and/or modify certain types of organizational data for their organization.

The organizational data for each organization can include data directly entered into the organizational management platform and/or can include data retrieved, pulled, or otherwise obtained from one or more first party and/or third-party applications with which the organizational management platform may have varying levels of integration. This ingestion and storage of data from third-party applications is in contrast to systems which simply sit on top of third-party applications and apply rules at run time. In some implementations, the organizational management platform can provide a user with the ability (e.g., by configuring Simple Mail Transfer Protocol (SMTP) settings) to configure the cadence or periodicity at which the organizational management platform receives or ingests data (e.g., via .csv files) from third-party applications.

The organizational data can, in some implementations, be held as one or more object databases. For example, multiple object classes can be defined in the object databases. Example object classes include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects and edges that correspond to links or logical associations between objects and/or object attribute(s). Graph(s) can be traversed to understand or leverage relationships among objects and their attribute(s). In one example, the organizational data can be synthesized into a single graph which includes multiple classes of objects and defines complex relationships among objects and their attribute(s). For example, all workflows, including payroll, IT, etc. can be run through one platform and graph. In some implementations, the employee objects can be referred to and/or treated as sentinel nodes.

As used herein, the term "data element" can refer to one or more data objects, an attribute value for one or more data objects, and/or other forms of data such as fields, references, columns, or values. Data elements can be stored in a dataset. A dataset can be stored in a single database or can be distributed among multiple databases. Datasets can be stored in database tables and/or in other formats such as the data graph structure described herein.

In some implementations, the organizational data can include organizational structure data. For example, the organizational structure data can be encoded within links or edges defined between objects of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g. the "work laptops" group of the devices).

Some example aspects of the present disclosure can leverage or be implemented using a domain-specific query language. For example, the domain-specific query language can be used to perform (e.g., in real time) queries against the organizational data. The domain-specific query language can be used to define functions or queries which return data that satisfies or responds to the functions or queries. In some implementations, the domain-specific query language is a declarative language. In some implementations, the domain-specific query language includes organization functions or operators which leverage organizational relationships within the organizational data. For example, the organization function ORG(employee,relationship) returns one or more other employees that have the specified relationship to the specified employee.

Thus, example aspects of the present disclosure recognize that organizations generally use many applications and systems to sustain operations. For example, small organizations generally may use several, a dozen, or any number of applications and systems. Medium-sized organizations generally may use several dozen, a hundred, or any number of applications and systems. Large organizations generally may use hundreds, thousands, and/or any number of applications and systems. Many, most, and/or all of the applications and systems used by an organization rely on organizational data and processing tied to the organizational data.

However, very few applications and systems provided by one party (e.g., another organization, a vendor, a provider, a supplier, etc.) offer integration with applications and systems from other parties. As a result, organizations may build expensive, proprietary integration applications that require maintenance and usually break when one or more of the associated applications and/or systems is changed by the vendor (e.g., especially in scenarios where an organization defines and uses their own custom fields that rely on organizational data provided by a vendor application or system). Further, organizations that do not have the resources or expertise to build such proprietary integration applications rely on constant manual upkeep of organizational data across different applications and systems, which generally results in delays, inconsistencies, and errors. As such, organizations can benefit from improved application integration and synchronization of organizational data across different applications and systems.

The present disclosure provides examples of performing application integration and synchronization of data across distributed applications and systems. In examples of the present disclosure, a computer system may perform such integration and synchronization between applications and systems, for example, by obtaining application data associated with an application that is separate from a computing system that comprises organizational data of an organization, analyzing the application data based on one or more rules associated with the computing system and integration information for integrating the application with the organizational data of the organization, processing the application data based on the integration information associated with the third-party application, and performing one or more operations associated with the organizational data in the organizational system based on processing the application data. The organizational system also may generate and transmit information to one or more other applications integrated with the organizational system based on performing the operations associated with the organizational data.

According to an aspect of the present disclosure, the organizational management platform can pull, retrieve, or otherwise receive data from one or more linked third-party applications. The organizational management platform can then process or otherwise leverage this data in reports, policies, triggering, data management, and/or workflows using employee record data or other organizational data held by the core system of record.

As one example, an organizational management platform can receive application data from a third-party application of a plurality of third-party applications. The application data can be descriptive of an action performed in the third-party application. For example, the action can be a user-performed action performed by a user in the third-party application or the action can be an application-performed action performed by the third-party application. As one example, the action can describe an update to data stored in or otherwise associated with the third-party application.

The organizational management platform can access one or more rules associated with an organization and integration information for integrating the third-party application with the organizational data of the organization. The access of the integration information can be performed periodically and/or in specific response to receipt of the data from the third-party application. The integration information associated with the third-party application can describe how changes to various forms of data (e.g., data contained in the platform's centralized database and/or data contained in the third-party application) should cause actions (e.g., data updates) to be performed in the third-party application and/or in the centralized database. One or more sets of integration information can be defined for each application. Integration information may be specific to each application and/or may be shared across multiple applications.

The organizational management platform can evaluate the integration information associated with the third-party application to determine one or more operations associated with implementing the integration information. The one or more operations associated with implementing the integration information can include causing an action to be performed in the third-party application and/or causing an action to be performed in the platform's centralized database. As one example, an action in the platform's centralized database can include an update to data stored in the database (e.g., an employee record stored in the database).

In some instances, the organizational management platform can communicate with the third-party application to cause the action to be performed in the third-party application by the third-party application. For example, the action in the third-party application can include updating of data held by the third-party application or other actions within the third-party application (e.g., triggering of intra-application communications, etc.).

In some implementations, the rules, integration information, and/or application policy associated with the third-party application can be a user-defined policy defined by an administrator of the organizational management platform. As one example, the user-defined application policy can be a user-defined query expressed in a domain-specific query language. In such instances, evaluating the policy can include executing the user-defined query relative to the set of organizational data. For example, the query may return a set of results (e.g., employee objects or other data objects) for which actions should be taken in the third-party application and/or within the centralized database.

With reference to the Figures, example embodiments of the present disclosure will be discussed in further detail.

FIG. 1 depicts a block diagram of an example environment 100 including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols, encodings or formats, and/or protection schemes. For example, communication over the network 102 can be performed using: communication protocols such as, for instance, transmission control protocol/internet protocol (TCP/IP), hypertext transfer protocol (HTTP), simple mail transfer protocol (SMTP), and/or file transfer protocol (FTP); encodings or formats such as, for instance, hypertext markup language (HTML) and/or extensible markup language (XML); and/or protection schemes such as, for instance, virtual private network (VPN), secure HTTP, and/or secure sockets layer (SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an application specific integrated circuit (ASIC), a field-programmable gate array (FPGA), a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), programmable ROM (PROM), electrically erasable PROM (EEPROM), erasable PROM (EPROM), one or more flash memory devices, and/or one or more magnetic storage devices (e.g., one or more hard disk drives). Memory devices 116 can include devices which operate as database(s) to store dataset(s).

The one or more processors 114 can be configured to execute one or more instructions to perform the operations described herein including, for example, one or more operations associated with providing multi-platform application integration and data synchronization across one or more applications including, for example, third-party applications. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include obtaining third-party application data, analyzing third-party application data based on one or more rules and/or integration information associated with a related third-party application, processing the third-party application data based on the integration information and one or more organizational records, and performing one or more operations associated with the organizational data based on processing third-party application data, etc.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices, etc.), and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications which can include one or more third-party applications, which may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with providing application integration and synchronization) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, and/or other types of data.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications) that can be stored and/or executed by such one or more computing devices 152. Further, the one or more applications can include one or more third-party applications that may be accessed from the one or more computing devices 152 and which are at least partly operated from such one or more computing devices 152. Data 158 may include, for example, one or more portions of the organizational data (e.g., one or more organizational records), one or more data structures associated with the organizational data, rule data, organizational policy data, application policy data, third-party integration data (e.g., third-party application integration data), and/or other types of data.

Figure 2:
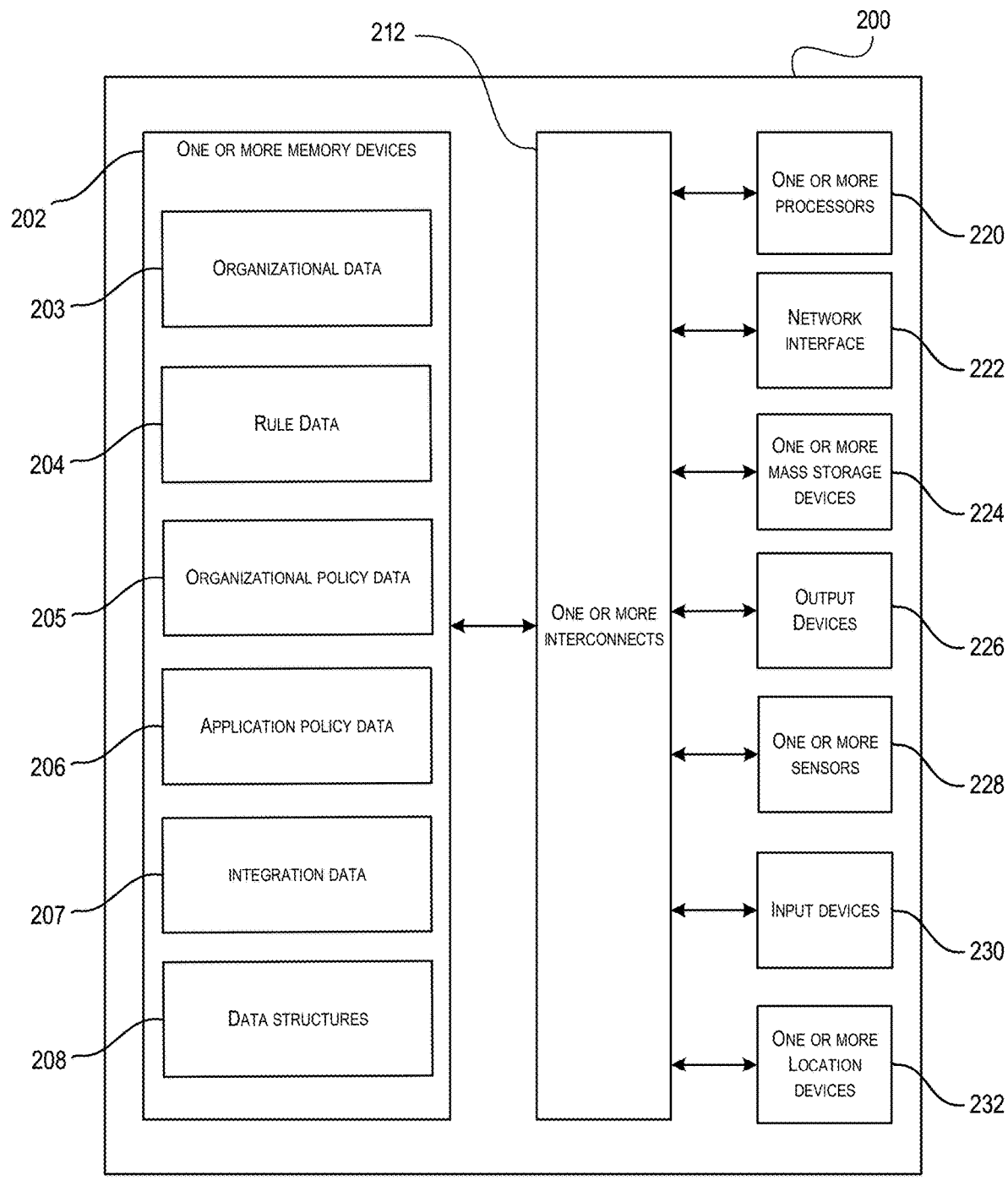
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, organizational policy data 205, application policy data 206, integration data 207, data structures 208, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, organizational policy data 205, application policy data 206, integration data 207, data structures 208, and/or any other data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations associated with providing application integration and data synchronization across one or more third-party applications, including, for example, obtaining third-party application data, analyzing third-party application data based on one or more rules and integration information associated with a related third-party application, processing the third-party application data based on the integration information and one or more organizational records, and performing one or more operations associated with the organizational data based on processing third-party application data.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200.

The rule data 204 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The rule data 204 can include information associated with one or more rules that can be used to generate and/or implement an application policy. The rule data 204 also can include information associated with one or more rules of an organizational data management system (e.g., base or default rules provided or enforced by the system, one or more custom rules configured by an organization, etc.). In some embodiments, the rule data 204 can be received from one or more computing systems (e.g., the remote computing system 130 depicted in FIG. 1), which can include one or more computing systems that are remote from the computing device 200.

The organizational policy data 205 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the organizational policy data 205 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 205 can be received from one or more computing systems (e.g., the remote computing system 130 depicted in FIG. 1) which can include one or more computing systems that are remote from the computing device 200.

The application policy data 206 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. Furthermore, the application policy data 206 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The integration data 207 can include configuration and/or operational information associated with integrating and synchronizing data among one or more applications. For example, the integration data 207 can include information that enables integration and synchronization between each of one or more applications (e.g., third-party applications or other applications). In an embodiment, the integration data 207 provides integration information that allows an organizational data management (e.g., a system of record for organizational data and organizational data processing), for example, to obtain information from one or more applications (e.g., third-party and/or other applications), to perform operations involving organizational data in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160 which are depicted in FIG. 1) that are stored in the one or more memory devices 116, the one or more memory devices 136, and/or the one or more memory devices 156, respectively. The data structures 208 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 208 can be implemented and utilized with one or more types of computer software, computer hardware, or any combination thereof. In an embodiment, the data structures 208 are used to represent and perform processing associated with various types of organizational data. For example, the data structures 208 may include information about various types of information and entities associated with organizational data including, but not limited to, individuals (e.g., employees, vendors, independent contractors), departments, teams, groups, locations, offices, documents, tasks, reports, accounts, devices, applications, end-user applications, licenses, workflows, alerts, and/or any other types of entities representing or related to managing organizational data. The data structures 208 also can define various relationships among the various entities associated with organizational data. For example, the data structures 208 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data based on one or more organizational data management applications).

In some embodiments, the data structures 208 can include one or more object graphs providing information about entities, relationships, and/or any other aspects relating to the definition, structure, and rules associated with organizational data. The data structures 208 also can include any one or more other types of data structures (e.g., with or without the use of object graphs) that provide information about entities, relationships, and/or any other aspects of the definition, structure, and rules associated with organizational data. In some embodiments, the data structures 208 can be received from one or more computing systems (e.g., the remote computing system 130 depicted in FIG. 1), which can include one or more computing systems that are remote from the computing device 200. Data structures 208 can include one or more datasets stored in one or more databases.

The one or more interconnects 212 can include one or more interconnects or buses that can be used to send and/or receive one or more signals (e.g., electronic signals) and/or data (e.g., organizational data 203, rule data 204, organizational policy data 205, application policy data 206, integration data 207, data structures 208, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the organizational policy data 205, the application policy data 206, the integration data 207, the data structures 208, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the organizational policy data 205, the application policy data 206, the integration data 207, the data structures 208, and/or any other data. The one or more output devices 226 can include one or more display devices (e.g., liquid crystal display (LCD), organic light emitting diode (OLED) display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
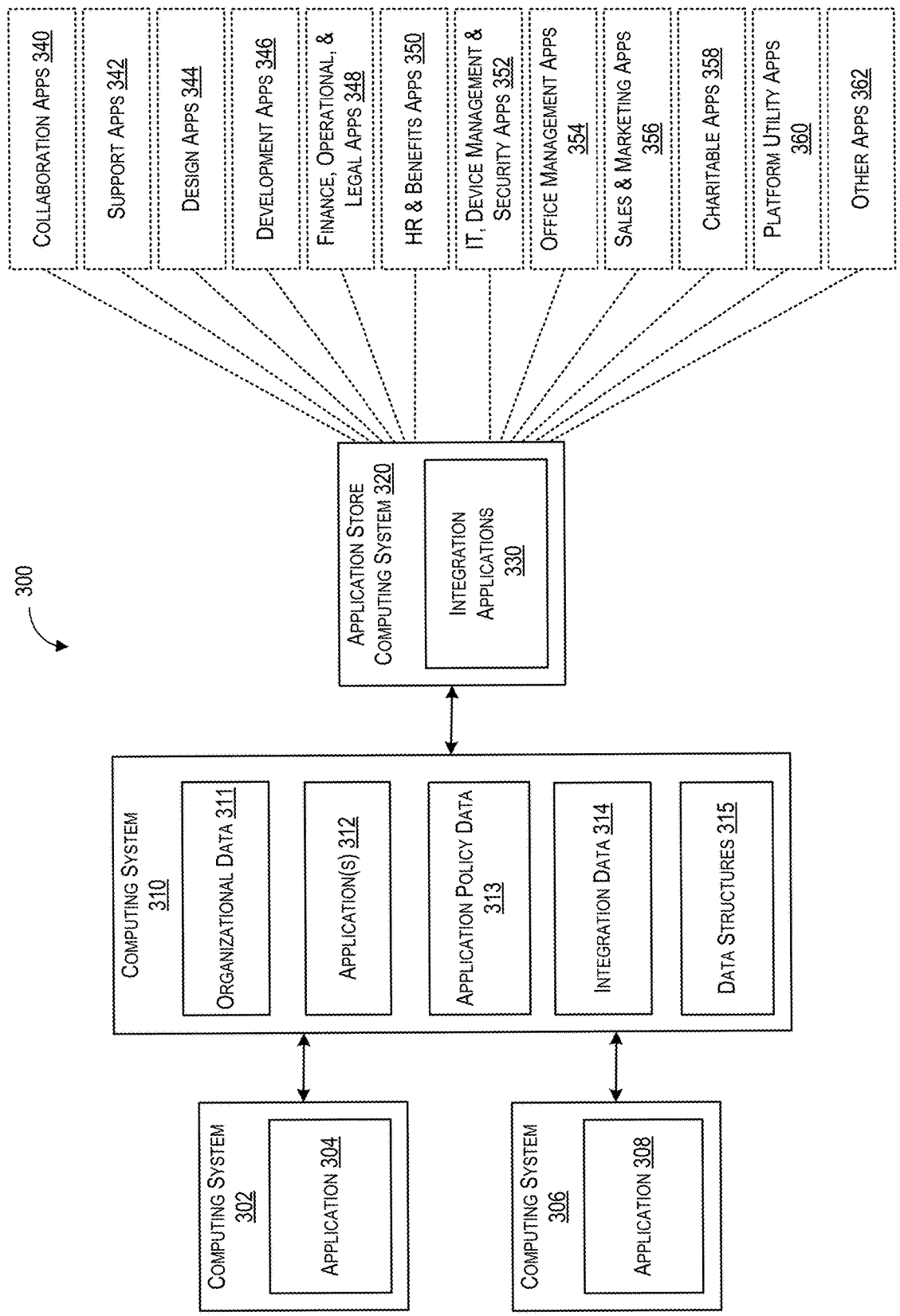
FIG. 3 depicts a block diagram of an example computing environment including multiple computing systems, according to example embodiments of the present disclosure.

FIG. 3 depicts a block diagram of an example computing environment 300 including multiple computing systems, according to example embodiments of the present disclosure. Any of computing system 302, computing system 306, or computing system 310 can include one or more attributes and/or capabilities of the computing system 110, the remote computing system 130, the one or more computing devices 152, and/or the computing device 200. Furthermore, any of the computing system 302, the computing system 306, or the computing system 310 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, an application 304, the computing system 306, an application 308, the computing system 310, organizational data 311, one or more application(s) 312, application policy data 313, integration data 314, data structures 315, application store computing system 320, integration applications 330, collaboration apps 340, support apps 342, design apps 344, development apps 346, finance, operational, and legal apps 348, human resources (HR) and benefits apps 350, information technology (IT), device management, and security apps 352, office management apps 354, sales and marketing apps 356, charitable apps 358, platform utility apps 360, and other apps 362.

In an embodiment, the computing system 302, the computing system 306, the computing system 310, and/or the application store computing system 320 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include an email application that performs one or more operations on the computing system 302 and includes an email account associated with an organizational record (e.g., an employee record including the name of an employee, an email access identifier, and an email passcode) that is stored as part of the organizational data 311. In an example, a user associated with any computing system 302, 306, 310 can use a portion of the organizational data 311 associated with their employee record to access a corresponding account associated with one or more of application 304, application 308, and/or application(s) 312.

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment statuses for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect when an employee receives a promotion or a raise, changes to a different department, is added to one or more new teams, etc.

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating and/or performing one or more other operations associated with the application(s) 312 on the computing system 310 and that can manage one or more aspects of one or more other applications on different systems and devices, which may include the application 304 and/or the application 308.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls and/or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, or platform.

The application policy data 313 can include one or more rules that determine how one or more applications including, for example, one or more third-party applications or organizational applications are accessed, modified, and/or controlled. For example, the application policy data 313 can use the organizational data 311 that is associated with the application(s) 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications (e.g., applications owned and controlled by an organization that owns and controls the organizational data 311 and/or applications provided with or as part of an organizational data management system used by the organization as the system of record for maintaining the organizational data 311, etc.) and/or one or more third-party applications are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing systems 302, 306, and 310) and/or applications (e.g., such as applications 304, 308, and 312). For example, the integration data 314 can be used to integrate and synchronize organizational data 311 and/or associated operations across an organizational data management application or system (e.g., a system of record for organization data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, 308) that use or perform operations based on the organizational data 311). Such integration data 314 may include, but is not limited to, information indicating and/or describing various data that enables performance of an integration between applications or systems, such as an integration type information (e.g., flat file, application programming interface (API), webhook, system call, etc.), security information (e.g., authentication information, encryption information, etc.) technical information (e.g., file locations, call information, system naming, application naming, Internet Protocol (IP) address information, port information, etc.), integration flow information (e.g., push, pull, bidirectional, etc.), integration activation (e.g., scheduling or timing information, event information, one or more rules, one or more triggering conditions or criteria, etc.), processing information (e.g., data mappings between the source and target, data validation rules, data transformations, error handling, etc.), and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, performing integration and synchronization of the organizational data 311 with one or more different third-party applications and/or systems. In an embodiment, the data structures 315 generally can include information about the properties or attributes of each of one or more entities associated with the organizational data 311. Data structures 315 also can include information describing relationships associated with one or more entities associated with the organizational data 311. In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating workflows, executing workflows, creating reports, running reports, etc.

In an embodiment, the data structures 315 can include one or more object graphs that provide information about entities, relationships, rules, constraints, and/or any other aspects of managing the organizational data 311. For example, such object graphs can include one or more nodes representing entities associated with the organizational data 311 and one or more edges that connect and represent relationships between the nodes. The data structures 315 can also include organizational data and/or associated metadata. In addition, the data structures 315, together or alone, generally may represent one or more aspects of an application or system (e.g., such as an organizational data management system that is a system of record for organizational data 311 of an organization).

In an embodiment, the application store computing system 320 provides an organization with access to multiple different integration applications 330 for integrating organizational data 311 and/or associated processes with and across various different applications and/or systems (e.g., such as third-party applications and/or systems). Application store computing system 320 also may provide an organization with one or more other types of applications, including but not limited to, platform utility apps 360 that provide additional functionality to an organizational data management application or system, other apps 362 that may include integration-related applications, and/or any other types of applications. Generally, the application store computing system 320 may provide one or more various applications for a flat fee, based on a subscription purchase, for a fee based on usage, for a fee based on a number of users, computing systems, processors, or any other criteria, as part of a limited trial, for free, and/or generally under any type of arrangement. In an embodiment, the application store computing system 320 is managed and provided by the same party that provides an organizational data management system to organizations. For example, the integration applications 330 provided by the application store computing system 320 generally may be specialized for use with the organizational data management system (e.g., and not end-user versions of applications that would be installed for general purpose use by end-users on end-user devices).

In an embodiment, the integration applications 330 generally can be any application that allows an organization to manage any one or more aspects associated with providing one or more corresponding end-user applications to individual members, teams, roles, departments, and/or any other grouping or categorization of individuals in an organization. For example, each of the integration applications 330 can be used by an organization to control and automate various tasks associated with provisioning, configuring, maintaining, and integrating third-party applications. In some embodiments, one or more of the integration applications 330 can allow an organization to configure automated assignment of a corresponding end-user application to one or more individuals, user account creation, single sign-on setup, provisioning, installation, setup, and/or maintenance of corresponding end-user applications (e.g., third-party applications or other applications provided for use by end users) provided to particular individuals, groups, and/or one or more devices associated with such individuals or groups in the organization.

In an embodiment, one or more of the integration applications 330 can provide integration of organizational data 311 and associated services across third-party applications or computing systems and one or more applications or computing systems of an organization associated with organizational data 311. For example, each of the integration applications 330 can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications 330 and/or other applications provided by the application store computing system 320 may include, but are not limited to, collaboration apps 340, support apps 342, design apps 344, development apps 346, finance and legal apps 348, human resources (HR) and benefits apps 350, information technology (IT), device management, and security apps 352, office management apps 354, sales and marketing apps 356, charitable apps 358, platform utility apps 360, and/or other apps 362. Generally, various different types of applications provided by the application computing system 320 may be organized, categorized, grouped, presented, and/or otherwise offered in any type of arrangement, and thus are not limited to any particular examples discussed herein, which are provided for illustration purposes only.

In an embodiment, collaboration apps 340 may include, for example, any applications that provide scheduling, communications, document sharing and management, electronic signature services, project management, productivity, and/or any other types of applications that facilitate work between individuals, groups, and/or parties.

In an embodiment, support apps 342 may include, for example, any applications that provide services associated with customer support, technical support, issue reporting, issue management and escalation, tracking and managing help desk tickets, and/or any other types of applications that facilitate customer, business, and/or technology support.

In an embodiment, design apps 344 may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps 346 may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps 348 may include, for example, any applications that provide services associated with accounting systems, budgeting systems, vendor management systems, payment systems, travel systems, expense management systems, supply chain systems, manufacturing systems, compliance and governance systems, vendor management systems, contract management systems, and/or any other types of applications and/or systems used to manage various aspects of an organization.

In an embodiment, human resources (HR) and benefits apps 350 may include, for example, any applications that provide services associated with recruiting and hiring, temporary staffing, background checks, payroll and benefits, training and onboarding, retirement planning and contributions, reward and bonus programs, employee training, learning management systems, performance management, time and attendance, and/or systems any other types of applications or systems associated with employee-related activities.

In an embodiment, information technology (IT), device management, and security apps 352 may include, for example, any applications that provide services associated with device management, technology, information security, password management, and/or any activities associated with managing applications, systems, devices, or associated technology.

In an embodiment, office management apps 354 may include, for example, any applications that provide services associated with facilities management, receptionist services, physical access, visitor access, catering services, office layout, office assignments, and or any other types of applications or systems associated with performing office management.

In an embodiment, sales and marketing apps 356 may include, for example, any applications that provide services associated with social media, analytics, advertising, event management, customer relationship management, content creation and distribution, public relations, business generation, campaign management, and/or any other types of similar or related activities.

In an embodiment, charitable apps 358 may include, for example, any applications that provide services associated with donations, charitable giving, crowdfunding, etc.

In an embodiment, platform utility apps 360 may include, for example, any applications from a provider that allow an organization to utilize software applications, systems, or services that have been purchased or that are otherwise available from the provider. For example, a provider of an organizational data management system can allow an organization to access and utilize standard services and/or enhanced services one or more of the platform utility apps 360. In some embodiments, the platform utility apps 360 operate from and/or are directly integrated with applications, systems, and/or services obtained from a provider. For example, such platform utility apps 360 can allow one or more users of an organization to customize a particular implementation or instance of provider software that is associated with the organization. In one example, one of the platform utility apps 360 can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflow tasks, reports, integrations, etc.

In an embodiment, other apps 362 may include, for example, any types of applications that may be used by individuals and/or organizations. The other apps 362 may include, for example, any other category of integration applications 330 and/or any other types of applications that can be executed by a computing system or device.

In an embodiment, authorized users of an organization with the appropriate privileges may access one or more services of the application store computing system 320 directly, for example, via a website, web page, desktop application, mobile application, and/or any other type of application to browse, view, search, compare, evaluate, download, install, configure, upgrade, uninstall, and/or perform any other types of activities associated with the integration applications 330 or any other types of applications provided via the application store computing system 320. In some embodiments, authorized users of an organization with the appropriate privileges may access one or more services of the application store computing system 320 indirectly, for example, through another application (e.g., application 312) and/or another computing system (e.g., computing system 310). In some embodiments, the application store computing system 320 can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications 330 for use by the organization. For example, any such user with the appropriate privileges may install one or more of the integration applications 330 for the organization on the computing system 310 or any other computing systems or devices. Also, any such user with the appropriate privileges may configure integration data 314 associated with each of one or more integration applications 330. In some embodiments, one user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize, that perform processing involving or based on, and/or that are otherwise associated with organizational data 311. The organizational data management system also can automate various processing based on the organizational data 311 including, but not limited to the automation of processing performed across various third-party applications based on the organizational data. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party applications) that generate, utilize, process, or perform activities based on organizational data 311. Such integration generally allows an organizational data management system to orchestrate and automate processing of organizational data 311 and associated activities across numerous different applications that are not in communication with one another. In some embodiments, an organizational data management system can allow appropriate users (e.g., authenticated, authorized, privileged, etc.) of an organization to, for example, manage organization information, settings of an organizational data management system, onboarding of employees, offboarding of employees, employee information, organizational structure and locations, employee placement in departments and teams, workflows and tasks, reports, documents, and/or any other information associated with organizational data 311.

In one embodiment, computing system 310 can generate a combined dataset (also referred to herein as a "connected data report" or "joined report") using multiple (e.g., two or more) disparate datasets that can be included in organizational data 311, application policy data 313, integration data 314, and/or data structures 315 and/or can be associated with (e.g., used as input or generated by) application 304, application 308, application(s) 312, and/or integration application(s) 330. That is, for example, in this embodiment, computing system 310 can facilitate intelligent generation of a connected data report from such multiple disparate datasets by: identifying two or more of such disparate datasets that collectively contain data elements that are to be included in the connected report (e.g., data elements that have been requested by way of computing system 302 or 306 for inclusion in the connected data report); and automatically (e.g., without human intervention) generating one or more proposed (e.g., recommended, suggested) join configurations that can be used to combine the two or more disparate datasets and/or requested data elements.

In example embodiments described herein, "join configurations" can define how two or more different datasets and/or data elements therein can be combined (e.g., by computing system 310) into a connected data report. In example embodiments described herein, a "join" can refer to a single combination of data elements from two different datasets. For instance, a connected data report that includes data elements combined from two different datasets can be defined herein as having one join, while a connected data report that includes data elements combined from three different datasets can be defined herein as having two joins, and so on.

In some embodiments, computing system 310 can execute the proposed join configuration(s) to generate the connected data report. In other embodiments, a user (e.g., a user implementing computing system 302 or 306) can edit the proposed join configuration(s) (e.g., using a graphical user interface described herein) to create one or more customized join configurations. In these embodiments, computing system 310 can then execute the customized join configuration(s) to generate the connected data report.

In some embodiments, computing system 310 can generate a custom connected data report that can include data elements that can be requested and/or specified by a user. For example, computing system 310 can generate and provide a graphical user interface to computing system 302 or 306 for rendering on a display or monitor of computing system 302 or 306. In this example, such a graphical user interface can include a list of various datasets that are included in and/or otherwise accessible to computing system 310 (e.g., datasets stored in, used, and/or generated by application 304, application 308, organizational data 311, application(s) 312, application policy data 313, integration data 314, data structures 315, and/or integration application(s) 330). In this example, the user can specify (e.g., via the graphical user interface) various portions or subsets (e.g., columns, objects, attributes) of the various datasets for inclusion in the custom connected data report. In this example, computing system 310 can then automatically generate one or more proposed join configurations for joining the specified portions of the datasets.

In addition to custom reports, in some embodiments, computing system 310 can generate a connected data report from a template that can be pre-defined (e.g., by computing system 310 as described below), which can also be referred to herein as a "recipe" or a "pre-defined recipe". In these embodiments, such a connected data report that can be generated by computing system 310 using such a recipe can constitute a pre-defined template report. In these embodiments, the data elements to be included in such a pre-defined template report (e.g., the data elements that can be requested (e.g., by a user implementing computing system 302 or 306) for inclusion in the pre-defined template report) can be pre-defined (e.g., by computing system 310) and/or modifiable by a user (e.g., a user implementing computing system 302 or 306).

In multiple embodiments, computing system 310 can provide (e.g., via a graphical user interface) a number of different pre-defined recipes that are pre-built for different use cases and respectively include one or more pre-defined join configurations that can be executed (e.g., via computing system 310) to join data from two or more datasets. In these embodiments, the user can select (e.g., via the graphical user interface) a certain pre-defined recipe that contains such pre-defined join configuration(s) that computing system 310 can then execute to join data from two or more datasets. In these embodiments, computing system 310 can then provide (e.g., via the graphical user interface) the user with a connected data report generated according to the pre-defined recipe, where such a connected data report includes the data from the two or more datasets. In some embodiments, the user can edit (e.g., via the graphical user interface) the pre-defined recipe, the pre-defined join configuration(s) that have been pre-built for the pre-defined recipe, and/or the resulting connected data report. For example, in these embodiments, the user can select the pre-defined recipe and then edit, add, and/or remove one or more of the pre-defined join configuration(s) of the pre-defined recipe.

In some embodiments, some or all of the data (e.g., data in at least one dataset of two or more different datasets) that can be accessed by computing system 310 to generate a connected data report as described herein can include third-party application data that is accessed from a third-party application (e.g., a third-party application that is separate from computing system 310). In some embodiments, some or all of the data (e.g., data in at least one dataset of two or more different datasets) that can be accessed by computing system 310 to generate a connected data report as described herein can include employee data elements (e.g., data fields, objects, and/or values in organizational data 311) that correspond respectively to employees of an organization (e.g., a company).

In at least one embodiment of the present disclosure, computing system 310 can provide (e.g., via a graphical user interface) a user with the ability to select data from a number of different datasets. In this embodiment, at least one of the different datasets can be a dataset that can be collected, imported, and/or accessed from (e.g., by computing system 310) a third-party application (e.g., application 304, application 308, application(s) 312, integration application(s) 330) and/or otherwise associated with such a third-party application. In this embodiment, at least one of the different datasets can be a dataset that can include employee data elements (e.g., data fields, objects, and/or values in organizational data 311) that correspond respectively to employees of an organization (e.g., a company). Thus, one benefit of computing system 310 according to example embodiments of the present disclosure is that it enables joining third-party data with existing organizational data such as, for example, human resources data that can include employee data elements that respectively correspond to employees of an organization. As one example, computing system 310 can generate a connected data report that can illustrate how different employee(s) and/or department(s) of an organization handle issue tracking tickets in a third-party agile project management system.

According to example embodiments of the present disclosure, computing system 310 can generate an extensive number of recipes (e.g., pre-defined recipes) related to various use cases and/or applications (e.g., third-party applications) and present a user with a graphical menu (e.g., via a graphical user interface) where such recipes and/or one or more attributes thereof can be selected, searched, modified, and/or filtered. In these embodiments, such recipes can include and/or constitute one or more specific join configurations that can be used to join certain types of different datasets associated with certain use cases and/or applications (e.g., third-party applications).

In some embodiments, when generating a custom report or a recipe-based report, computing system 310 can automatically generate (e.g., define, specify, create) and/or determine (e.g., identify) a number of join configurations for joining different datasets. In some embodiments, such join configurations can constitute default join configurations that can be pre-defined (e.g., pre-established and/or pre-created by computing system 310) for a given set (e.g., pair) of different datasets. For instance, in one example embodiment, computing system 310 can define (e.g., specify, create) a default join configuration for combining data from a payroll application dataset and a time and attendance application dataset. In another example embodiment, computing system 310 can define (e.g., specify, create) a default join configuration for combining a payroll application dataset and a dataset that contains a roster of employees.

In some embodiments, computing system 310 can define such default join configurations by specifying: one or more attributes of the different datasets, the data elements included in the different datasets, or the connected data report (e.g., layout, grouping, aggregation); and/or the join configuration logic described below that defines how to combine the different datasets (e.g., by specifying a join key that can include one or more data elements of the different datasets that can be used as joining points for the different datasets as described below). In some embodiments, computing system 310 can define and/or create a join configuration (e.g., a default join configuration) such that it includes a join key having one or more specified data elements used as one or more joining points for two or more different datasets.

In some embodiments, a developer of and/or an entity implementing computing system 310 or application store computing system 320 can define the above-described default join configurations as initial defaults. In some embodiments, a user implementing computing system 302 or 306 can define such default join configurations as initial defaults for similar joins going forward (e.g., for similar connected data reports that can be subsequently generated by computing system 310 using the default join configurations). In some embodiments, an entity (e.g., user, developer) implementing computing system 302 or 306, computing system 310, or application store computing system 320 can define such default join configurations by specifying (e.g., via a graphical user interface generated by computing system 310): one or more attributes of the different datasets, the data elements included in the different datasets, or the connected data report (e.g., layout, grouping, aggregation); and/or the join configuration logic described below that defines how to combine the different datasets (e.g., by specifying a join key that can include one or more data elements of the different datasets that can be used as joining points for the different datasets as described below).

In some embodiments, computing system 310 can store one or more of the above-described default join configurations in a memory device (e.g., memory device(s) 116, 136, 156) and/or database that can be accessed by computing system 310. In these embodiments, when generating the join configuration(s) for combining different datasets, computing system 310 can access such default join configurations to determine and/or identify which can be used to combine the different datasets. In these embodiments, computing system 310 can further execute one or more of such default join configurations to combine different datasets.

In example embodiments described herein, when creating the above-described recipes or default join configurations and/or when generating a custom report or a recipe-based report, computing system 310 can automatically (e.g., without human intervention) determine the join configurations that can be used to combine different datasets by evaluating a set of join configuration logic. For example, in one embodiment, computing system 310 can identify one or more shared data fields, values, columns, objects, and/or other data elements in a set (e.g., pair) of different datasets. In this embodiment, computing system 310 can select one of such shared data field(s), value(s), column(s), object(s), and/or other data elements in the set (e.g., pair) of different datasets as a join key for the join configuration according to various criteria. As such, in this or another embodiment, a join configuration described herein (e.g., a default join configuration, custom or user-specified join configuration) can include such a join key that can use one or more data elements of different datasets as a joining point(s) for combining the different datasets. Thus, computing system 310 can provide and implement a unique approach to automatically determining the join configurations.

In one example embodiment, when evaluating the set of join configuration logic to identify and/or select a join key for the join configuration, computing system 310 can evaluate a degree of matching between the shared data fields, values, columns, objects, and/or other data elements in the different datasets. For example, in one embodiment, the degree of matching can be based on the number of specific entries that match between the datasets, where a relatively high number of matching entries can be indicative of a relatively high degree of matching and a relatively low number of matching entries can be indicative of a relatively low degree of matching. In another example embodiment, the degree of matching can be based on the data type of the data fields, values, columns, objects, and/or other data elements. For example, in this embodiment, computing system 310 can match date fields from one dataset with date fields from another dataset.

In some embodiments, to identify one or more pairs of data elements in different datasets that have matching data types, computing system 310 can perform a data type inference process in which the data type of a given data element can be inferred (e.g., using a machine learning (ML) and/or artificial intelligence (AI) algorithm and/or model). That is, for instance, in these embodiments, computing system 310 can automatically (e.g., without human intervention) infer (e.g., using an ML and/or AI algorithm and/or model) a data type for each data element contained in each of two or more different datasets and further identify one or more pairs of data elements in the two or more different datasets that have matching data types. In these embodiments, computing system 310 can then use the inferred data type to determine a degree of matching between the data elements from the different datasets. In these embodiments, computing system 310 can further select a certain type of data element shared by the different datasets and/or a certain type of data element having a relatively high degree of matching across the different datasets as the join key for the join configuration.

In another example embodiment, when evaluating the set of join configuration logic to identify and/or select a join key for the join configuration, computing system 310 can evaluate a sparsity between the respective data fields, values, columns, objects, and/or other data elements in the different datasets. For example, in one embodiment, computing system 310 can evaluate a degree to which a certain data field, column, or object within two or more datasets is sparse. In this embodiment, relatively less sparse data fields, values, columns, objects, and/or other data elements can be preferred for selection as a join key. Accordingly, in this embodiment, computing system 310 can select a certain relatively less sparse data element shared by the different datasets as the join key for the join configuration.

In some embodiments, computing system 310 can prioritize and/or rank certain data fields, values, columns, objects, and/or other data elements for using as the join key when shared and available. For example, in these embodiments, computing system 310 can prioritize and/or rank employee identifier fields, values, columns, objects, and/or other data elements for selection if available (e.g., if shared between a set (e.g., pair) of different datasets). In these embodiments, a relatively high level of prioritization and/or ranking can be indicative of a preferred data element to be used as a join key for the join configuration. In some embodiments, a developer of and/or an entity implementing computing system 310 or application store computing system 320 can establish (e.g., define) the priority and/or ranking of such certain data elements for selection if available (e.g., if shared between a set (e.g., pair) of different datasets). In some embodiments, a user implementing computing system 302 or 306 can establish (e.g., define) the priority and/or ranking of such certain data elements for selection if available (e.g., if shared between a set (e.g., pair) of different datasets). For example, in these embodiments, a user implementing computing system 302 or 306 can pre-establish a correspondence between certain data fields, values, columns, objects, and/or other data elements within two or more different datasets.

Thus, in example embodiments of the present disclosure, computing system 310 can automatically (e.g., without human intervention) select a shared data field, value, column, object, or other shared data element as a join key on the basis of a degree of matching, a sparsity metric, according to a pre-defined prioritization, and/or other conditions. For example, in some embodiments, computing system 310 can implement a scoring function to evaluate these characteristics and provide a score for each of a number of different candidate join key(s) and/or join configuration(s). In these embodiments, computing system 310 can select the join key and/or join configuration that receives the highest score as the initial join key and/or the initial proposed join configuration, respectively.

In some embodiments, computing system 310 can surface (e.g., render in a graphical user interface) a number of potential join configurations to a user (e.g., a user implementing computing system 302 or 306). For example, in these embodiments, computing system 310 can propose an initial join configuration, but can also provide a list of alternative join configurations from which the user can select. For instance, in these embodiments, the alternative join configurations can be presented in a drop-down menu (e.g., a drop-down menu of the graphical user interface). In these embodiments, computing system 310 can provide information such as matching score, level of sparsity, priority, and/or other information for each potential join configuration.

More generally, in at least one embodiment, computing system 310 can generate, maintain, and/or provide a graphical user interface that enables the user (e.g., via computing system 302 or 306) to view aspects of a generated connected data report. In one example embodiment, the graphical user interface can include a join configuration section that shows the proposed join configurations and enables the user to edit, remove, and/or add the join configurations. In another example embodiment, the graphical user interface can include a schema section that presents a schema of how a connected data report is joined in a graphical presentation. In yet another example embodiment, the graphical user interface can include a preview section that presents a preview of the report data that be included in a connected data report.

Thus, in some embodiments, regardless of whether computing system 310 generates a custom connected data report or a recipe-based connected data report (e.g., a connected data report generated from a recipe), computing system 310 can expose the underlying framework of such a report in the above-described graphical user interface. In these embodiments, the user can modify the connected data report, starting from the recipe, in whatever way the user wants. Therefore, in these embodiments, unlike fixed templatized reports, computing system 310 can generate a recipe-based connected data report that can constitute an initial and/or entry point report that provides the user preselected values, and further modify such a report in any way the user wants.

In some embodiments, when a connected data report includes a dataset collected from or associated with a third-party application or other changing datasets, computing system 310 can determine whether the dataset has been appropriately refreshed and/or whether the dataset is up to date (e.g., current). For example, in these embodiments, certain datasets may have a refresh interval in which the dataset refreshes within a database. In these embodiments, computing system 310 can ensure that the connected data report contains the latest copy of the dataset. For example, in these embodiments, if the dataset has not completed an initial import (e.g., into a database accessible by computing system 310), it will not show (e.g., in the above-described graphical user interface) as being available yet. In these embodiments, computing system 310 can wait until an ingestion of the dataset has been completed before visualizing this data (e.g., in the above-described graphical user interface) for selection for inclusion within a connected data report. In some embodiments, computing system 310 can continuously and/or periodically facilitate refreshes of datasets using, for instance, a combination of web hooks and application programming interface (API) refreshes.

Another aspect of the proposed reporting systems is the efficient generation of a report preview. For example, in some embodiments, computing system 310 can generate a report preview (e.g., in a graphical user interface) in a manner that shows in the report preview a set of preview data that is most representative of the full connected data report. Specifically, in these embodiments, computing system 310 can generate a report preview having preview data that can include a sampling of the full data to be included in the connected data report. In these embodiments, to generate such a report preview having such a sampling of the full data to be included in the connected data report, computing system 310 can: sample (e.g., extract, read and write) a subset of entries (e.g., data fields, values, objects, columns, rows, and/or other data elements) from each of two or more different datasets (e.g., computing system 310 can sample a respective subset of entries from each of the two or more different datasets); combine sampled subsets of entries according to one or more join configurations to generate a set of preview data; and provide a graphical user interface that displays at least a portion of the set of preview data (e.g., computing system 310 can provide a graphical user interface having a report preview section that can display the set of preview data).

In some embodiments, the one or more join configurations that computing system 310 can use to generate the set of preview data for displaying in the report preview can be the same join configuration(s) computing system 310 can use to generate the full, complete connected data report. In some embodiments, computing system 310 can generate the set of preview data for displaying in the report preview as described above before computing system 310 executes the join configuration(s) to generate the full, complete connected data report. That is, for instance, in these embodiments, computing system 310 can sample the respective subsets of entries from the different datasets, combine the sampled subsets of entries to generate the set of preview data, and display the set of preview data in a report preview section of a graphical user interface before executing the join configuration(s) to generate the full, complete connected data report.

As an example, in one embodiment, a connected data report can include data from three tables and generation of the connected data report by computing system 310 can involve joining the three tables. In this embodiment, to generate the preview data, computing system 310 can avoid loading data in all those tables, joining them, and sampling them, because this approach would have significant computational latency, as it involves loading all of the data. Instead, in some embodiments, computing system 310 can sample all of the tables independently and then join the samples to generate a preview dataset. Thus, by performing sampling prior to joining, rather than joining and then sampling, computing system 310 can improve the computational efficiency of report preview generation.

However, in some instances, if samples from datasets (e.g., tables) are naively joined by computing system 310 (e.g., joined prematurely and/or without ensuring the data is current), the joins will be mostly empty, resulting in a preview dataset that contains mainly empty data. In some embodiments, to prevent this result, computing system 310 can oversample from the datasets and then generate the preview data by removing empty entries and/or selecting entries based on degree of sparsity. In at least one embodiment, in providing a graphical user interface having a report preview section that displays at least a portion of the set of preview data as described above, computing system 310 can select a subgroup of the set of preview data for displaying in the report preview section, where such a subgroup of the set of preview data can have a reduced sparsity relative to the set of preview data as a whole. That is, for instance, in this embodiment, computing system 310 can select for displaying a subgroup of the set of preview data that has relatively more entries (e.g., more data) and/or is relatively more representative of the set of preview data as a whole compared to one or more other subgroups of the set of preview data.

To provide an example, assume it is desired in one embodiment to have a report preview with 20 rows for previewing data from three tables. In this embodiment, when computing system 310 samples from the three tables, computing system 310 can sample, for instance, 100 rows from each table (e.g., 100 random rows). In this embodiment, computing system 310 can then join the 100 rows (e.g., according to automatically determined or user selected join configuration(s)). In this embodiment, computing system 310 can then take 20 of the "best" rows out of the joined tables for use in the preview. For example, in this embodiment, computing system 310 can select the 20 rows that are most representative of the data. For instance, in this embodiment, computing system 310 can select the 20 rows that have the least number of empty cells.

In other embodiments, the selection of the initial samples (e.g., the initial 100 rows) by computing system 310 can be guided by sampling logic. In one example embodiment, computing system 310 can sample the tables based on a data field, column, or object that is expected to be included and/or non-sparse in the largest number of tables. For example, in this example embodiment, computing system 310 can use an identifier field (e.g., employee identifier) as focus for initial sampling.

In some embodiments, once computing system 310 creates a sample join table or other form of a preview dataset, computing system 310 can further maintain the preview dataset so that if the user modifies certain aspects of the connected data report to be generated, then computing system 310 can reuse the preview data instead of performing the sampling process again, thereby conserving computational resources. For example, in these embodiments, if the user changes the grouping or aggregation of the connected data report to be generated and the user makes such changes in a way that does not alter the underlying datasets or their joins (e.g., resulting joined data), then computing system 310 can reuse the preview dataset to generate a new preview dataset.

Thus, computing system 310 according to example embodiments described herein can provide report previews that benefit the consumer of the connected data report to be generated (e.g., by providing a preview dataset that is most representative of the full connected data report to be generated), while also providing latency-based benefits (e.g., by performing preview sampling in a way that is most likely to include non-sparse data which enables computing system 310 to avoid re-performing the sampling process).

In example embodiments, computing system 310 can adapt (e.g., define, change) the number of samples performed for generating the preview data based on the content of the connected data report to be generated. Thus, in some embodiments, computing system 310 can detect that a lesser number of rows are to be sampled, whereas in other embodiments, computing system 310 can detect that a larger number of rows are to be sampled. In one example embodiment, for a connected data report that joins employee data and data from a software development application, computing system 310 can fetch (e.g., extract, sample) a larger number of rows for the software development application. In this embodiment, computing system 310 can fetch the larger number of rows for the software development application based on knowledge that when the rows are joined, it is less likely to have a match. Therefore, when sampling the datasets in this embodiment, computing system 310 can fetch a larger number of rows. In another example embodiment, for a connected data report that joins employee data and payroll data, computing system 310 can fetch a smaller number of rows. In this embodiment, computing system 310 can fetch the smaller number of rows based on an expectation that payroll data and employee data will have a relatively higher degree of matching (e.g., a relatively higher degree of matching on an initial proposed join key). Thus, in embodiments described herein, by adaptively determining a number of samples to perform based on an expected degree of matching, computing system 310 can strike an appropriate balance between the quality of preview data and the sampling latency.

In at least one embodiment, computing system 310 can provide the user with the ability to modify the proposed join configurations (e.g., via a graphical user interface described herein). For example, in this embodiment, computing system 310 can allow for the user to add a new join configuration or "action," where the new action can be a new aggregation or a new join. For instance, in this embodiment, adding a new join can involve adding additional data elements from an additional dataset that is different from initial datasets used to generate an initial combined dataset and/or an initial connected data report. In example embodiments of the present disclosure, an aggregation can involve computing system 310 performing a grouping at a department level. Thus, computing system 310 according to example embodiments described herein can generate a connected data report that can be entirely customizable on how the data is joined or merged, when or where the data is aggregated, and/or another criterion or condition.

In some embodiments, the datasets described herein that can be accessed by computing system 310 can be contained in one or more "no structured query language (SQL) databases or "no SQL" databases (e.g., one or more MongoDB databases). Thus, in these embodiments, computing system 310 can provide SQL-like interfaces over "no SQL" databases. In some embodiments, at least one of the data elements (e.g., data elements requested by a user implementing computing system 302 or 306) that are to be included in a connected data report can include and/or constitute a custom field that can provide a value that can be calculated according to query expression written in a query language. For example, in one embodiment, at least one of the data elements requested by a user (e.g., via computing system 302 or 306) for inclusion in a connected data report can include and/or constitute a custom field that can provide a value that can be calculated according to query expression written in a query language. For instance, in some embodiments, such a custom field can provide a value that can be calculated (e.g., by computing system 310) according to a query expression written in the above-described domain-specific query language that can be used to perform (e.g., in real time) queries against the organizational data such as, for example, organizational data 311.

In some embodiments, the connected data reports and/or connected data reporting functionality of, for instance, computing system 310 as described herein can be accessed within a dedicated reports application (e.g., within a dedicated reports application of application(s) 312 and/or integration application(s) 330). In additional or alternative embodiments, the connected data reports and/or connected data reporting functionality of, for instance, computing system 310 as described herein can be accessed within other applications (e.g., within other applications of application(s) 312 and/or integration application(s) 330). For example, in one embodiment, a user may be working in a payroll application (e.g., using computing system 302 or 306) to approve payroll. In this embodiment, computing system 310 can embed connected data reports within the payroll application (e.g., generate and/or render connected data reports for viewing within the payroll application). In this embodiment, by embedding connected data reports within the payroll application (e.g., by generating and/or rendering connected data reports for viewing within the payroll application), computing system 310 can thereby allow for surfacing of insights and/or different connected data reports there that can improve the user's experience. In some embodiments, computing system 310 can embed a connected data report in an application such that the user can expand the embedded connected data report to a full-page view and access the full configurability that they would have within the dedicated reports application.

In some embodiments, to enable embedded connected data reports, computing system 310 can cache and store report data of a connected data report and/or the connected data report itself (e.g., where the connected data report can be previously generated and include such report data). In these embodiments, when a user visits a particular page or application, computing system 310 can load (e.g., visually render in a graphical user interface) the report data and/or the connected data report right away rather than taking time to generate the connected data report from scratch (e.g., using a recipe having a default join configuration(s) or using a join configuration(s) selected by the user). Thus, in some embodiments, computing system 310 can provide (e.g., visually render in a graphical user interface) a cache view of the report data and/or the connected data report. In some embodiments, the cached report data and/or the cached connected data report can be manually updated (e.g., an update can be triggered by a user) and/or can be automatically updated by, for instance, computing system 310 (e.g., according to some periodicity and/or triggered by a change in data). More particularly, in some embodiments, computing system 310 can perform an automatic update (e.g., without human intervention) when it detects that data written in the databases will affect or change the cached report data and/or the cached connected data report. For example, in these embodiments, computing system 310 can perform dependency tracking as applied to reports to determine whether the cached report data and/or cached connected data report could be potentially affected by a change in underlying data. In these embodiments, when computing system 310 maps a change to the cached report data and/or the cached connected data report, computing system 310 can automatically (e.g., without human intervention) refresh the cached report data and/or cached connected data report, thereby allowing for the cached report data and/or cached connected data report to always be fresh and/or accurate. In another embodiment, computing system 310 can refresh the cached report data and/or cached connected data report when it detects that a certain threshold number of changes to the underlying data have been completed (e.g., as opposed to a refresh upon every single data change).

In some embodiments of the present disclosure, computing system 310 can provide for handling of permissions as applied to reports. For example, in one embodiment, each different user may have a different set of permissions to access different data. In this embodiment, if report data is cached by computing system 310 and then viewed at a company level, this may not account for permissions. However, in this embodiment, if computing system 310 caches connected data reports at an individual level, this creates significant computational overhead. Therefore, in some embodiments of the present disclosure, computing system 310 can generate a company level cache of connected data reports as a base and then apply permissions on the company level cache to generate a user-level view of certain connected data reports that accounts for user-specific permissions.

In at least one embodiment, computing system 310 can generate connected data reports relatively quickly by facilitating parallelized report generation. For example, in this embodiment, computing system 310 can parallelize the generation of a connected data report over multiple (e.g., tens, hundreds) of central processing units (CPUs) so that the connected data report is generated without an apparent delay to the user.

In another embodiment of the present disclosure, computing system 310 can provide a drill down feature for connected data reports. For example, in this embodiment, computing system 310 can provide (e.g., via a graphical user interface) a drill down feature that can enable users to quickly dis-aggregate data that is currently shown in an aggregated form. For instance, in this embodiment, a connected data report can show data aggregated or grouped by a certain attribute (e.g., by department). In this embodiment, such a drill down feature that can be provided by computing system 310 can allow the user to click on the data to quickly dis-aggregate and see the data on an individual basis. In this embodiment, such a drill down feature and/or process can be inherent to any grouped or aggregated data. Therefore, in this embodiment, a user can "drill down" any number of levels on any number of hierarchical aggregations. For example, in this embodiment, data which has been dis-aggregated from department to team status can be further dis-aggregated from team to individual status. Thus, in some embodiments, computing system 310 can automatically recognize that an aspect or element of any connected data report is an aggregation of data that can be broken down. In any of such embodiments, computing system 310 can provide the user with the ability to quickly dis-aggregate the data, any number of layers down.

FIGS. 4A, 4B, 4C, 4D, 4E, 4F, 4G, 4H, 4I, and 4J depict example graphical user interfaces 400*a*, 400*b*, 400*c*, 400*d*, 400*e*, 400*f*, 400*g*, 400*h*, 400*i*, and 400*j*, respectively, that can be generated and/or implemented (e.g., by computing system 310) in accordance with example embodiments described herein. In at least one embodiment described herein, computing system 310 can generate and/or provide (e.g., via network 102) any of graphical user interfaces 400*a*, 400*b*, 400*c*, 400*d*, 400*e*, 400*f*, 400*g*, 400*h*, 400*i*, 400*j* to one or more computing systems and/or devices described herein such as, for instance, computing system 110, computing device(s) 112, remote computing system 130, computing device(s) 132, computing device(s) 152, computing device 200, computing system 302, computing system 306, application store computing system 320, and/or another computing system or device. In this embodiment, computing system 310 can generate and/or provide (e.g., via network 102) any of graphical user interfaces 400*a*, 400*b*, 400*c*, 400*d*, 400*e*, 400*f*, 400*g*, 400*h*, 400*i*, 400*j* to such computing system(s) and/or device(s) such that an entity (e.g., a user, a human) implementing (e.g., using) one or more of these computing system(s) and/or device(s) can view and/or interface with any of graphical user interfaces 400a, 400b, 400c, 400d, 400e, 400f, 400g, 400h, 400i, 400j (e.g., via input device(s) 122, output device(s) 124, output device(s) 226, input device(s) 230).

FIG. 4A depicts an example graphical user interface 400a for browsing and selecting a report recipe or starting a new custom report, according to example embodiments of the present disclosure. As illustrated in the example embodiment depicted in FIG. 4A, computing system 310 can generate graphical user interface 400a such that it includes: one or more recipes 402a that can each be selected by a user to generate a specific connected data report in accordance with one or more embodiments described herein; and/or a button 404a (e.g., a virtual, digital button) that allows the user to create a new report (e.g., a custom connected data report) from scratch in accordance with one or more embodiments described herein. In the example embodiment depicted in FIG. 4A, each recipe of recipe(s) 402a can be pre-built by computing system 310 to include a specific join configuration(s) that computing system 310 can execute to combine data elements from different datasets associated with a certain use case(s) and/or application(s) (e.g., third-party applications).

Figure 4B:
FIG. 4B depicts an example graphical user interface for creating a new custom report, according to example embodiments of the present disclosure.

FIG. 4B depicts an example graphical user interface 400b for creating a new custom report (e.g., a custom connected data report), according to example embodiments of the present disclosure. As illustrated in the example embodiment depicted in FIG. 4B, computing system 310 can generate graphical user interface 400b such that it allows a user to select data elements or attributes from different datasets or across different applications and further allows the user to define (e.g., configure) how the data elements will be combined into a custom connected data report. For example, as illustrated in the example embodiment depicted in FIG. 4B, computing system 310 can generate graphical user interface 400b such that it allows a user to select a certain reporting period, certain attributes across different datasets or applications, and a certain layout for a custom connected data report. For instance, in this embodiment, computing system 310 can generate graphical user interface 400b such that it allows a user to customize join types (e.g., join keys, joining points), groupings, and/or aggregations for a custom connected data report. Further, in this embodiment, computing system 310 can generate graphical user interface 400b such that it displays a visual representation of a custom report preview 402b that can be generated by computing system 310 based on the user's selections.

FIG. 4C depicts an example graphical user interface 400c for selecting data elements for inclusion in a new custom report, according to example embodiments of the present disclosure. As illustrated in the example embodiment depicted in FIG. 4C, computing system 310 can generate graphical user interface 400c such that it allows a user to select data elements or attributes denoted as "variables" in FIG. 4C (e.g., annual salary equivalent, payroll name, time accrued in hours) from different datasets or across different applications (e.g., employee, payroll, time off, time and attendance) for combination and inclusion in a custom connected data report. In the example embodiment depicted in FIG. 4C, computing system 310 can generate graphical user interface 400b such that it also displays the data elements selected by the user (denoted as "Selected Variables" in FIG. 4C) and allows the user to remove one or more of such selected data elements.

Figure 4D:
FIG. 4D depicts an example graphical user interface for previewing a report and viewing or editing join configurations for a report, according to example embodiments of the present disclosure.

FIG. 4D depicts an example graphical user interface 400d for previewing a report and viewing or editing join configurations for a report, according to example embodiments of the present disclosure. As illustrated in the example embodiment depicted in FIG. 4D, computing system 310 can generate graphical user interface 400d such that it displays one or more join configurations 402d that can be generated by computing system 310 based on the user's selections from graphical user interface 400c and further displays a visual representation of a custom report preview 404d that can be generated by computing system 310 based on the user's selections from graphical user interface 400c. In this embodiment, computing system 310 can generate graphical user interface 400d such that it displays a join key for each of join configuration(s) 402d and allows a user to edit join configuration(s) 402d and/or a join key thereof, as well as add an action (e.g., a new join, a grouping, an aggregation) using an add action button 406d. For instance, in this embodiment, computing system 310 can generate graphical user interface 400d such that it allows a user to add an additional join configuration using add action button 406d. In this embodiment, computing system 310 can generate graphical user interface 400d such that it displays custom report preview 402d using only a subset or subgroup of the combined data elements selected by the user (e.g., a subset or subgroup of the combined data elements that is most representative of the combined data elements as a whole).

Figure 4E:
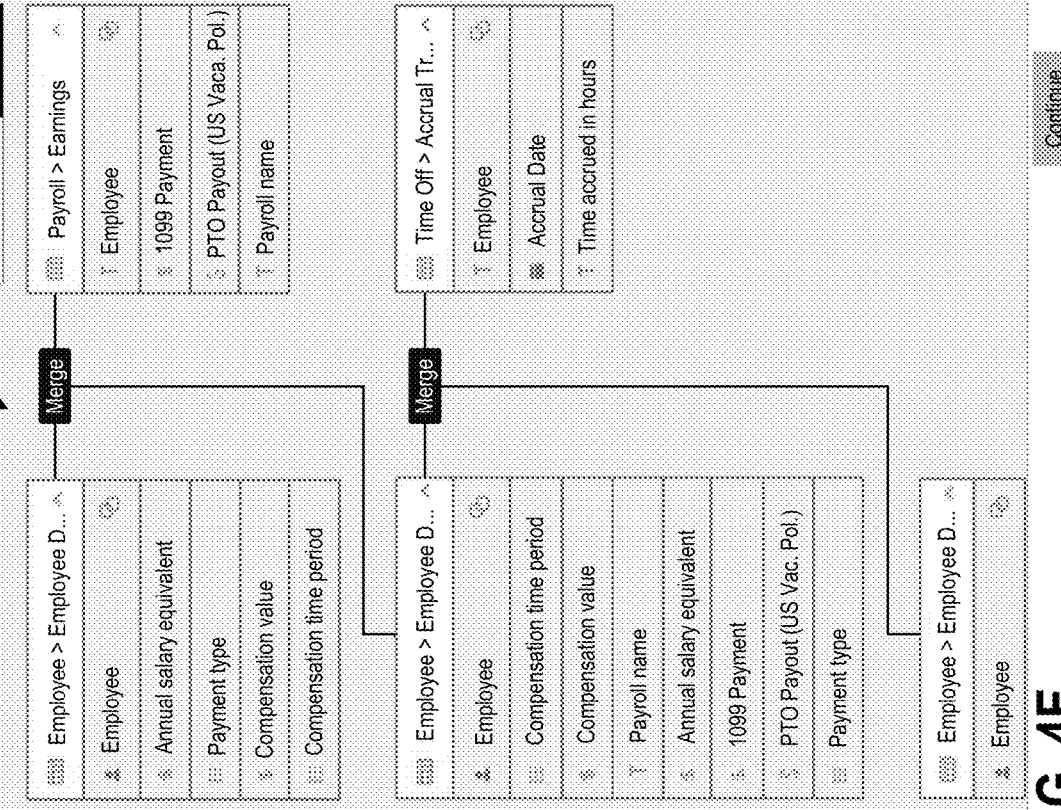
FIG. 4E depicts an example graphical user interface for viewing or editing a schema for a report and viewing or editing join configurations for a report, according to example embodiments of the present disclosure.

FIG. 4E depicts an example graphical user interface 400e for viewing or editing a schema for a report and viewing or editing join configurations for a report, according to example embodiments of the present disclosure. Graphical user interface 400e illustrated in the example embodiment depicted in FIG. 4E can constitute an example, non-limiting alternative embodiment of graphical user interface 400d described above and illustrated in FIG. 4D. That is, for instance, graphical user interface 400e can have the same attributes and/or functionality as that of graphical user interface 400d, however, computing system 310 can generate graphical user interface 400d such that it displays a schema 402e that illustrates how the user selected data elements will be combined into a custom connected data report according to join configuration(s) 402d.

Figure 4F:
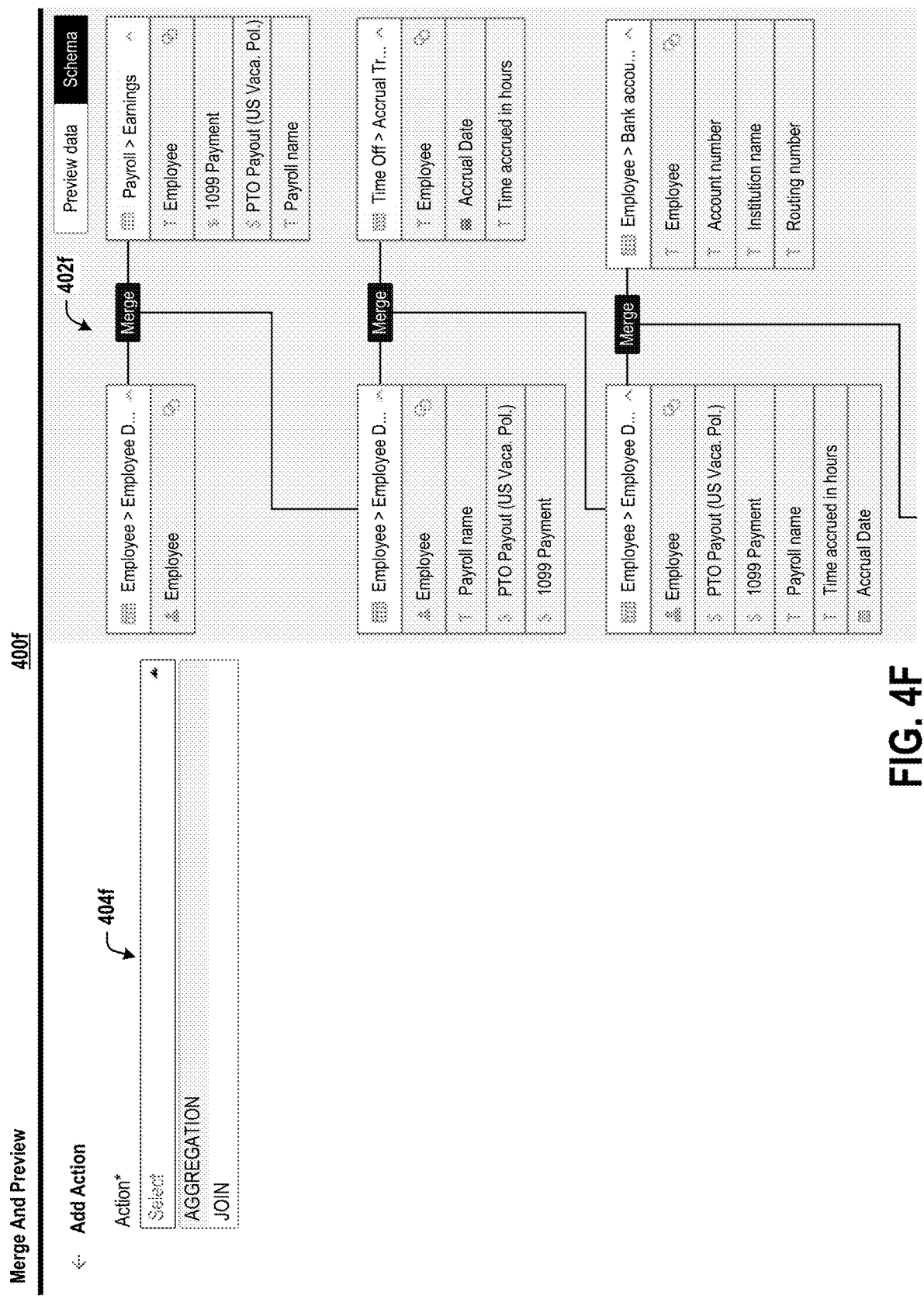
FIG. 4F depicts an example graphical user interface for adding a new action to a report generation configuration, according to example embodiments of the present disclosure.

FIG. 4F depicts an example graphical user interface 400f for adding a new action to a report generation configuration, according to example embodiments of the present disclosure. Graphical user interface 400f illustrated in the example embodiment depicted in FIG. 4F can constitute an example, non-limiting alternative embodiment of graphical user interface 400e described above and illustrated in FIG. 4E. That is, for instance, graphical user interface 400f can have the same attributes and/or functionality as that of graphical user interface 400e, however, computing system 310 can generate graphical user interface 400f such that it displays a modified schema 402f (e.g., a modified version of schema 402e) that illustrates how the user selected data elements will be combined into a custom connected data report according to a new action (e.g., aggregation, join) that can be selected by the user from a drop-down menu 404f.

Figure 4G:
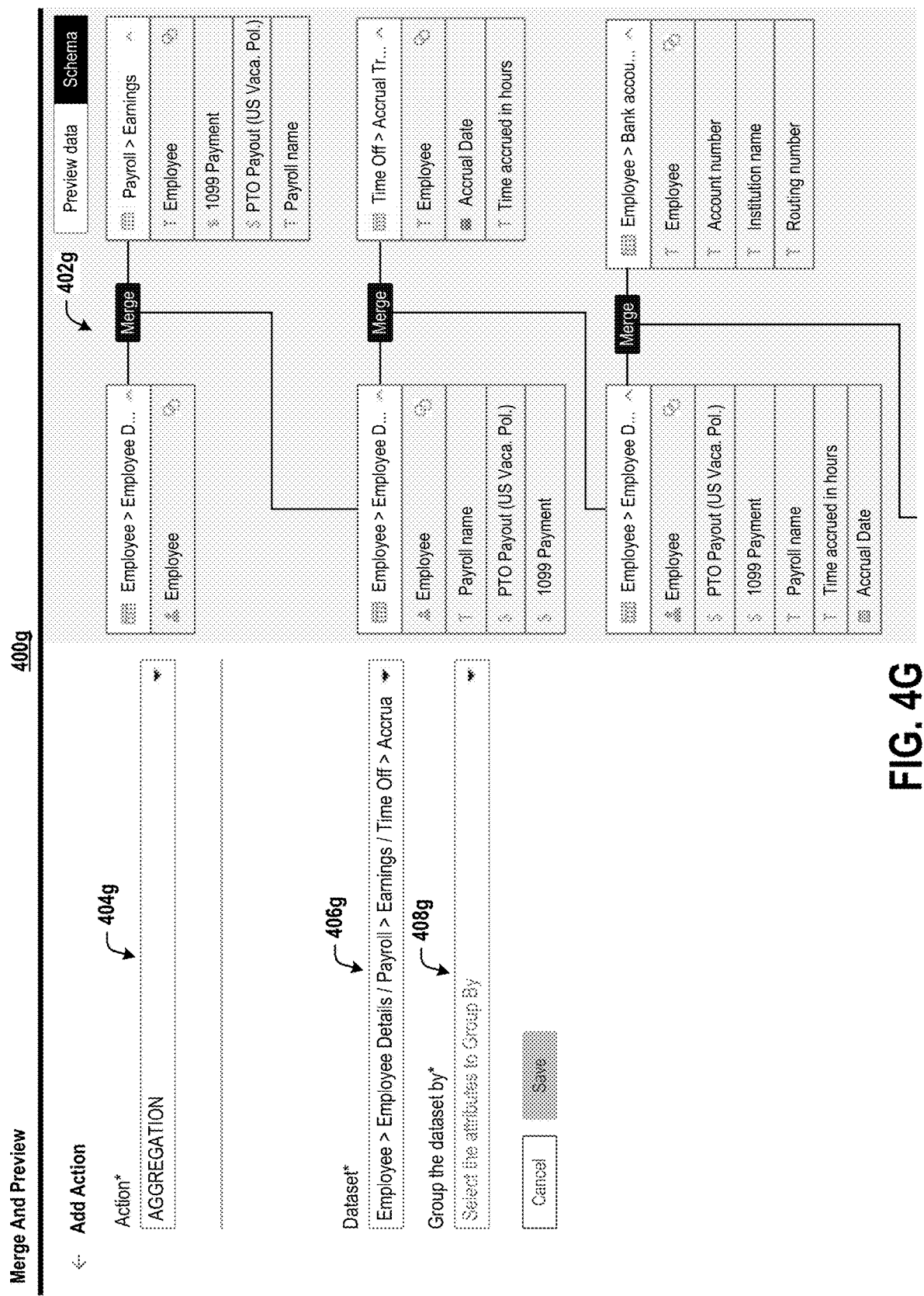
FIG. 4G depicts an example graphical user interface for adding a new aggregation action to a report generation configuration, according to example embodiments of the present disclosure.

FIG. 4G depicts an example graphical user interface 400g for adding a new aggregation action to a report generation configuration, according to example embodiments of the present disclosure. Graphical user interface 400g illustrated in the example embodiment depicted in FIG. 4G can constitute an example, non-limiting alternative embodiment of graphical user interface 400f described above and illustrated in FIG. 4F. That is, for instance, graphical user interface 400g can have the same attributes and/or functionality as that of graphical user interface 400f, however, computing system 310 can generate graphical user interface 400g such that it displays a modified schema 402g (e.g., a modified version of modified schema 402f) that illustrates how the user selected data elements will be combined into a custom connected data report according to: an aggregation action that can be selected by the user from a drop-down menu 404g; one or more datasets that can be selected by the user from a drop-down menu 406g; and/or a grouping of the dataset(s) according to attribute(s) that can be selected by the user from a drop-down menu 408g. As illustrated in the example embodiment depicted in FIG. 4G, computing system 310 can generate graphical user interface 400g such that it further allows a user to cancel or save an in-progress and/or complete custom join configuration that can be executed by computing system 310 to generate a custom connected data report according to the user's selections.

FIG. 4H depicts an example graphical user interface 400h for adding a formula field to a report, according to example embodiments of the present disclosure. As illustrated in the example embodiment depicted in FIG. 4D, computing system 310 can generate graphical user interface 400d such that it allows a user to create a formula field by inputting a formula or function in a formula input field 402h, where such a formula filed allows for new data to be created (e.g., calculated by computing system 310) using the user's existing data (e.g., the data elements selected by the user from graphical user interface 400c). In this embodiment, computing system 310 can generate graphical user interface 400h such that it can further display an explanation 404h of a formula field and/or one or more examples 406h that can describe various scenarios and/or corresponding formula fields that can be used for such scenarios.

FIG. 4I depicts an example graphical user interface 400i for editing a formula field for inclusion in a report, according to example embodiments of the present disclosure. Graphical user interface 400i illustrated in the example embodiment depicted in FIG. 4I can constitute an example, non-limiting alternative embodiment of graphical user interface 400h described above and illustrated in FIG. 4H. That is, for instance, graphical user interface 400i can have the same attributes and/or functionality as that of graphical user interface 400h, however, computing system 310 can generate graphical user interface 400i such that it allows a user to edit a formula field by, for example, adding a condition (e.g., a logical condition) and/or or a defining values or variables of the formula field in a formula input field 402i. In this embodiment, computing system 310 can generate graphical user interface 400i such that it can further display an explanation 404i of a selected formula field, where such an explanation 404i can include syntax of the selected formula field. In this embodiment, computing system 310 can generate graphical user interface 400i such that it can further display one or more examples 406i that can describe various scenarios and/or corresponding formula fields that can be used for such scenarios.

FIG. 4J depicts an example graphical user interface 400j for viewing a report, according to example embodiments of the present disclosure. Graphical user interface 400j can constitute an example graphical user interface that can be generated by computing system 310 such that it includes a complete custom connected data report 402j for viewing and/or editing by a user, where such a complete custom connected data report 402j can be generated by computing system 310 according to one or more example embodiments described herein.

Figure 5:
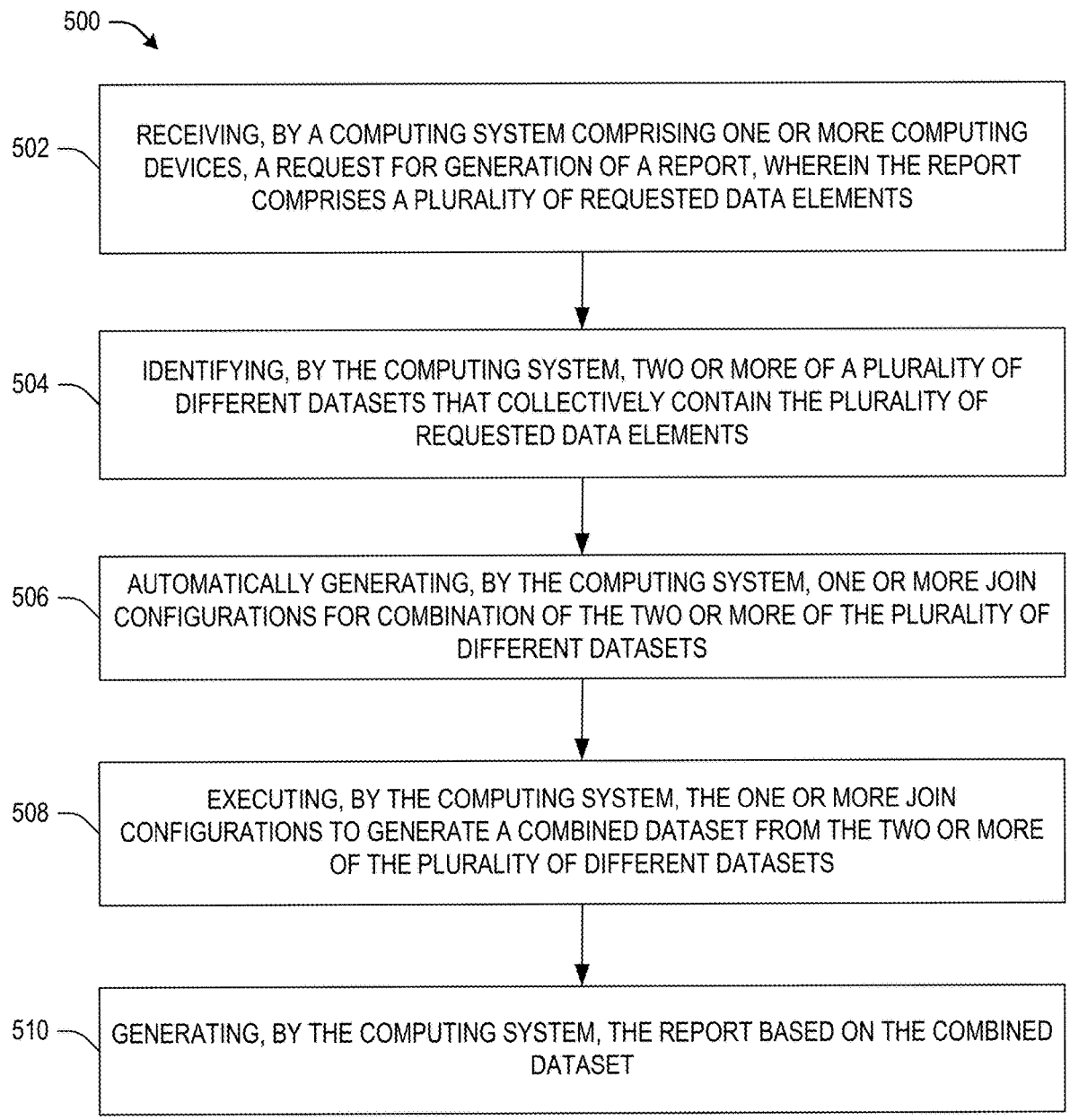
FIG. 5 depicts a flow diagram of an example computer-implemented method according to example embodiments of the present disclosure.

FIG. 5 depicts a flow diagram of an example computer-implemented method 500 according to example embodiments of the present disclosure. One or more portions of computer-implemented method 500 can be executed and/or implemented on one or more computing devices or computing systems including, for example, computing system 110, computing device(s) 112, remote computing system 130, computing device(s) 132, computing device(s) 152, computing device 200, computing system 302, computing system 306, computing system 310, and/or application store computing system 320. Further, one or more portions of computer-implemented method 500 can be executed and/or implemented as an algorithm and/or as machine-readable instructions (e.g., computer software) on the hardware devices and/or systems disclosed herein. The example embodiment illustrated in FIG. 5 depicts operations performed in a particular order for purposes of illustration and discussion. Those of ordinary skill in the art, using the disclosures provided herein, will understand that various operations or steps of computer-implemented method 500 or any of the methods disclosed herein can be adapted, modified, rearranged, performed simultaneously, include operations not illustrated, omitted, expanded, and/or altered in various ways without deviating from the scope of the present disclosure.

At 502, computer-implemented method 500 can include receiving (e.g., via network 102, graphical user interface 400a, graphical user interface 400b), by a computing system (e.g., computing system 110) comprising one or more computing devices (e.g., computing device(s) 112), a request for generation of a report (e.g., complete custom connected data report 402j or a recipe-based connected data report), wherein the report comprises a plurality of requested data elements (e.g., data elements associated with a recipe 402a selected by the user via graphical user interface 400a or data elements selected by the user via graphical user interface 400c).

At 504, computer-implemented method 500 can include identifying (e.g., in organizational data 311, application policy data 313, integration data 314, data structures 315), by the computing system, two or more of a plurality of different datasets that collectively contain the plurality of requested data elements.

At 506, computer-implemented method 500 can include automatically (e.g., without human intervention) generating, by the computing system, one or more join configurations (e.g., join configuration(s) 402d) for combination of the two or more of the plurality of different datasets.

At 508, computer-implemented method 500 can include executing, by the computing system, the one or more join configurations to generate a combined dataset from the two or more of the plurality of different datasets (e.g., as illustrated by join configuration(s) 402d, custom report preview 404d, schema 402e).

At 510, computer-implemented method 500 can include generating, by the computing system, the report (e.g., complete custom connected data report 402j) based on the combined dataset.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities.

These quantities can take the form of electrical or magnetic signals capable of being stored, transferred, combined, compared, and otherwise manipulated. These signals can be referred to as bits, values, symbols, characters, terms, numbers, or the like.

These terms and similar terms can be associated with physical quantities and can represent labels applied to these quantities. The terms including "analyzing," "accessing," "determining," "identifying," "adjusting," "modifying," "transmitting," "receiving," "processing," "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer-readable storage medium (e.g., non-transitory computer-readable storage medium), which can include any type of storage. For example, the storage can include hard disk drives, solid state drives, floppy disks, optical disks, read-only memories (ROMs), compact disc read-only memories (CD-ROMs), magnetic-optical disks, random access memories (RAMs), programmable ROM (PROM), erasable PROMs (EPROMs), electrically erasable PROMs (EEPROMs), magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for intelligent generation of data reports, the computing system comprising:
   one or more processors;
   one or more databases that store a set of organizational data, wherein the set of organizational data comprises a plurality of different datasets, and wherein each of the plurality of different datasets comprises a number of respective data elements; and
   one or more non-transitory computer-readable media that collectively store instructions that, when executed by the one or more processors cause the computing system to perform operations, the operations comprising:
      receiving a request for generation of a report, wherein the report comprises a plurality of requested data elements;
      identifying two or more of the plurality of different datasets that collectively contain the plurality of requested data elements;
      automatically generating one or more proposed join configurations for combination of the two or more of the plurality of different datasets;
      sampling the two or more of the plurality of different data sets to obtain a set of preview data;
      providing a user interface that displays at least a portion of the set of preview data, wherein providing the user interface that displays at least the portion of the set of preview data comprises selecting for display a subgroup of the set of preview data that has a reduced sparsity relative to the set of preview data as a whole;
      determining one or more final join configurations for combination of the two or more of the plurality of different datasets in response to receiving a user interaction from the user interface;
      executing the one or more final join configurations to generate a combined dataset from the two or more of the plurality of different datasets; and
      generating the report based on the combined dataset.

2. The computing system of claim 1, wherein at least one of the two or more of the plurality of different datasets comprises third party application data acquired from a third party application that is separate from the computing system.

3. The computing system of claim 1, wherein at least one of the two or more of the plurality of different datasets comprises a plurality of employee data elements that correspond to a plurality of employees of an organization.

4. The computing system of claim 1, wherein automatically generating the one or more proposed join configurations comprises:
   automatically inferring, using a machine learning model, a data type for each data element contained in each of the two or more of the plurality of different datasets; and
   identifying pairs of data elements in the two or more of the plurality of different datasets that have matching data types.

5. The computing system of claim 1, wherein automatically generating the one or more proposed join configurations comprises determining a default join configuration that has been previously specified for the two or more of the plurality of different datasets.

6. The computing system of claim 1, wherein:
   at least one of the two or more of the plurality of different datasets comprises a plurality of employee data elements that correspond to a plurality of employees of an organization;

automatically generating the one or more proposed join configurations comprises determining a default join configuration that has been previously specified for the two or more of the plurality of different datasets; and
the default join configuration comprises a join key that uses the plurality of employee data elements as a joining point for the two or more of the plurality of different datasets.

7. The computing system of claim 1, wherein the operations further comprise:
providing a graphical user interface that displays the one or more proposed join configurations.

8. The computing system of claim 7, wherein the graphical user interface enables a user to edit the one or more proposed join configurations.

9. The computing system of claim 7, wherein the graphical user interface enables a user to add an additional join configuration.

10. The computing system of claim 1, wherein the operations further comprise:
providing a graphical user interface that displays a graphical representation of a schema generated by the combination of the two or more of the plurality of different datasets.

11. The computing system of claim 1, wherein each of the one or more join configurations comprises a join key that comprises one or more specified data elements used as one or more joining points for the two or more of the plurality of different datasets.

12. The computing system of claim 11, wherein at least one of the one or more join configurations is a join configuration for joining a given set of datasets, and the operations further comprise:
providing a graphical user interface that displays the one or more join configurations and the join key for each join configuration, wherein the graphical user interface enables a user to edit the join key for the at least one join configuration for joining the given set of datasets.

13. The computing system of claim 1, wherein the report comprises a custom report and the plurality of requested data elements are specified by a user.

14. The computing system of claim 1, wherein the report comprises a pre-defined template report and the plurality of requested data elements are pre-defined but modifiable by a user.

15. The computing system of claim 1, wherein at least one of the plurality of requested data elements comprises a custom field that provides a value calculated according to query expression written in a query language.

16. A computer-implemented method for intelligent generation of data reports, the computer-implemented method comprising:
receiving, by a computing system comprising one or more computing devices, a request for generation of a report, wherein the report comprises a plurality of requested data elements;
identifying, by the computing system, two or more of a plurality of different datasets that collectively contain the plurality of requested data elements;
automatically generating, by the computing system, one or more proposed join configurations for combination of the two or more of the plurality of different datasets;
sampling, by the computing system, the two or more of the plurality of different data sets to obtain a set of preview data;
providing, by the computing system, a user interface that displays at least a portion of the set of preview data, wherein providing the user interface that displays at least the portion of the set of preview data comprises selecting for display a subgroup of the set of preview data that has a reduced sparsity relative to the set of preview data as a whole;
determining, by the computing system, one or more final join configurations for combination of the two or more of the plurality of different datasets in response to receiving a user interaction from the user interface;
executing, by the computing system, the one or more join configurations to generate a combined dataset from the two or more of the plurality of different datasets; and
generating, by the computing system, the report based on the combined dataset.

17. The computer-implemented method of claim 16, wherein the two or more of the plurality of different datasets comprises:
third party application data acquired from a third party application that is separate from the computing system; and
a plurality of employee data elements that correspond to a plurality of employees of an organization.

18. The computer-implemented method of claim 16, wherein automatically generating the one or more proposed join configurations comprises:
automatically inferring, using a machine learning model, a data type for each data element contained in each of the two or more of the plurality of different datasets; and
identifying pairs of data elements in the two or more of the plurality of different datasets that have matching data types.

19. The computing system of claim 11, wherein automatically generating one or more proposed join configurations comprises determining, based at least in part on a number of matching entries between a first data element of a first dataset of the two or more of the plurality of different datasets and a second data element of a second dataset of the two or more of the plurality of different datasets, the join key of at least one of the one or more proposed join configurations.

20. The computing system of claim 11, wherein automatically generating one or more proposed join configurations comprises determining, based at least in part on a sparsity of a data element of the two or more of the plurality of different datasets, the join key of at least one of the one or more proposed join configurations.

21. The computing system of claim 11, wherein automatically generating one or more proposed join configurations comprises determining, based at least in part on a scoring function, the join key of at least one of the one or more proposed join configurations.

22. The computing system of claim 11, wherein the scoring function is based at least in part on at least one of:
a sparsity of a data element of the two or more of the plurality of different datasets;
a degree of matching between a first data element of a first dataset of the two or more of the plurality of different datasets and a second data element of a second dataset of the two or more of the plurality of different datasets; and
a pre-defined prioritization associated with one or more data elements of the two or more of the plurality of different datasets.

23. The computing system of claim 11, wherein the operations further comprise:

providing a graphical user interface that displays the one or more join configurations and the join key for each join configuration, wherein:
the graphical user interface enables a user to edit the join key for each join configuration; and
the graphical user interface displays at least one of:
a sparsity associated with the join key; and
a matching score associated with the join key.

* * * * *